(12) United States Patent
Taniguchi

(10) Patent No.: US 6,411,784 B1
(45) Date of Patent: Jun. 25, 2002

(54) IMAGE FORMING SYSTEM AND PROCESSING METHOD IN IMAGE FORMING SYSTEM HAVING USER SIGNATURE VERIFICATION AND PRINTING CAPACITY

(75) Inventor: Masahiko Taniguchi, Kanagawa-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/717,251

(22) Filed: Nov. 22, 2000

(30) Foreign Application Priority Data

Nov. 24, 1999 (JP) .............................................. 11-332931

(51) Int. Cl.⁷ ........................ G03G 15/00; G03G 15/04; G03G 15/22; G06K 9/00
(52) U.S. Cl. ............................. 399/6; 382/119; 399/80; 399/366
(58) Field of Search ................................ 399/6, 79, 80, 399/81, 194, 366; 358/1.14; 382/119

(56) References Cited

U.S. PATENT DOCUMENTS

| 5,608,494 | A | * | 3/1997 | Ogura et al. ................. 399/366 |
| 5,742,879 | A | * | 4/1998 | Altrieth, III ................. 399/194 |
| 5,771,101 | A | * | 6/1998 | Bramall .................. 399/366 X |
| 5,822,660 | A | * | 10/1998 | Wen ........................... 399/194 |
| 5,911,095 | A | * | 6/1999 | Atsumi et al. ................. 399/80 |
| 5,974,161 | A | * | 10/1999 | York ........................... 382/119 |
| 5,974,548 | A | * | 10/1999 | Adams |
| 5,999,766 | A | * | 12/1999 | Hisatomi et al. .............. 399/80 |
| 6,148,093 | A | * | 11/2000 | McConnell et al. ......... 382/119 |

FOREIGN PATENT DOCUMENTS

JP          8-194413          7/1996

\* cited by examiner

*Primary Examiner*—Sandra Brase
(74) *Attorney, Agent, or Firm*—Foley & Lardner

(57) ABSTRACT

An image forming system includes a scanner to read image data, an image forming apparatus to form an image on an image receiving medium based on the image data, an input panel to input a user's manual signature and a memory to store an image of a user's manual signature. Further, the system includes a processing unit to collate an image of a user's manual signature input through the input panel with an image of a user's manual signature stored in the memory and to approve the use of at least one of the scanner and the image forming apparatus by user according to a result of the collation.

8 Claims, 22 Drawing Sheets

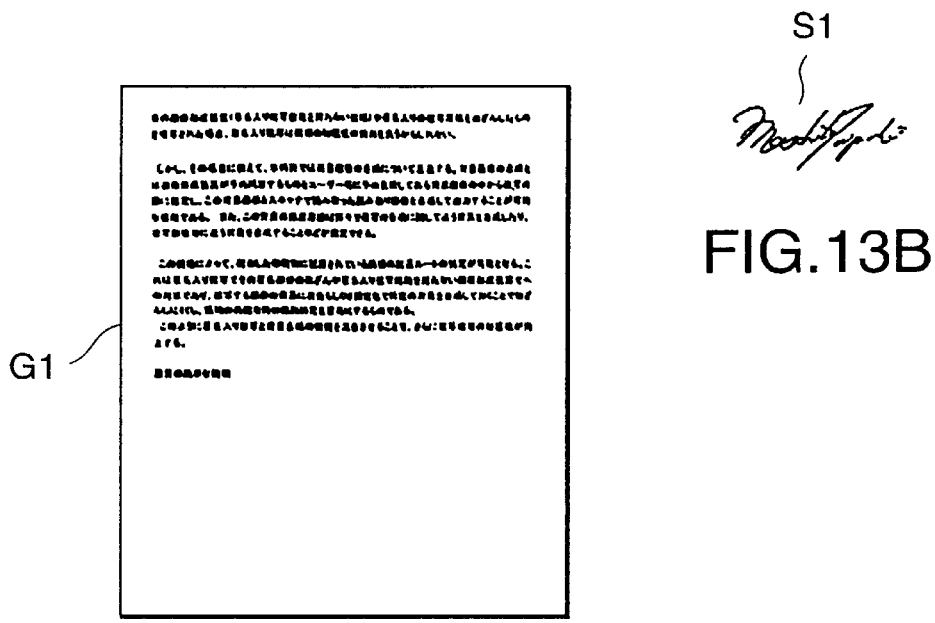
FIG.13B
FIG.13A
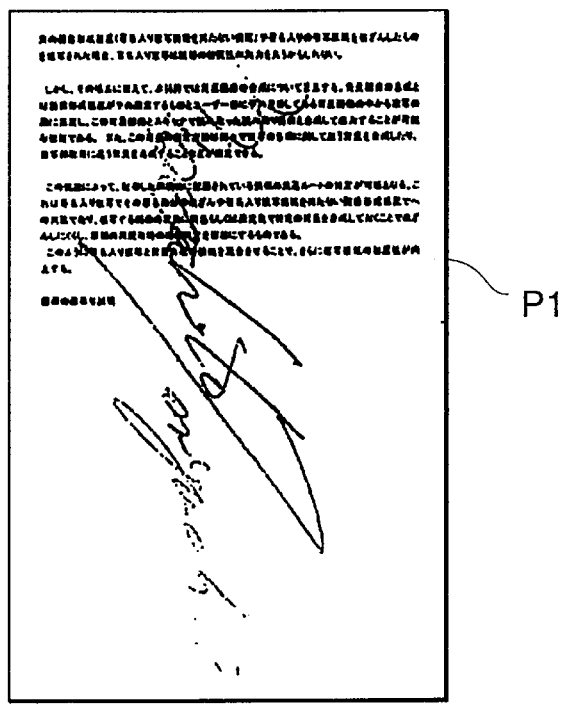
FIG.13C

IMAGE FORMING SYSTEM AND PROCESSING METHOD IN IMAGE FORMING SYSTEM HAVING USER SIGNATURE VERIFICATION AND PRINTING CAPACITY

BACKGROUND OF THE INVENTION

1. Field of the Invention

The present invention relates to an image forming system and a processing method in this image forming system with a function considered to manage use of an image forming system in digital copying machines, printers, etc. and enhance secrecy of image information.

2. Description of the Related Art

Image forming apparatus such as digital duplication machines so far had no mechanism particularly to protect secrecy of image information formed on a sheet of paper. As a sole means for restricting reproduction, a mechanism to allow use of an image forming apparatus for only a specific user who has a copy card is adopted.

However, the restriction of using an image forming apparatus by said copy card leads to enhancement of secrecy of image information by limiting usable users but does not directly protect secrecy of image information formed on a sheet of paper. Information once formed in an image on a sheet of paper can possibly be reproduced unlimitedly and there is such a problem that secrecy of image information cannot be protected.

Furthermore, with the development and wide use of domestic information equipment such as personal computer, printer, scanner, digital copier, etc., it becomes very easy and simple to reproduce image information formed on sheets of paper in recent years. As a result, secrecy of information formed on sheets of paper is further lowered. Definitely, as image information formed on sheets of paper is easily reproduced and there is caused redistribution of information by a third party that is not originally intended.

Further, in order to keep electronic information secret, the identification of user by a password is generally used. However, with the wide use of domestic information equipment, input of a password has become necessary for various equipment. Although it is desirable to set a different password to each of domestic information equipment from the viewpoint of keeping secrecy of information, there are many cases wherein users forget passwords or the same password is set for all domestic information equipment and security itself of electronic information is lowered.

SUMMARY OF THE INVENTION

It is an object of the present invention to provide an image forming system aimed at enhancement of secrecy of image information by restricting unnecessary reproduction of image information by recognizing users and a processing method in this image forming system.

According to the present invention, an image forming system is provided. The image forming system comprises a scanner configured to read image data; an image forming apparatus configured to form an image based on the image data on an image receiving medium; an input panel configured to input a user's manual signature; a memory configured to store an image of a user's manual signature; and a processing unit configured to collate an image of a user's manual signature input through the input panel with an image of a user's manual signature stored in the memory and to approve use of at least one of the scanner and the image forming apparatus by the user in accordance with a result of the collation.

Further, according to the present invention, a processing method in an image forming system including a scanner configured to read image data, an image forming apparatus configured to form an image based on the image data on an image receiving medium, an input panel configured to input a user's manual signature, and a memory configured to store an image of a user's manual signature. The processing method in the image forming system, comprising the steps of collating an image of a user's manual signature input through the input panel with an image of a user's manual signature stored in the memory; and approving use of at least one of the scanner and the image forming apparatus by the user in accordance with a result of the collation in the collating step.

BRIEF DESCRIPTION OF THE DRAWINGS

FIG. 13A is a plan view showing a document;

FIG. 13B is a plan view showing an input manual signature;

FIG. 13C is a plan view showing an image with a composite signature;

FIG. 20A is a plan view showing a distributed background image and FIG. 20B is a plan view showing a composite image information;

FIG. 21A is a plan view showing a distributed background image S5, FIG. 21B is a plan view showing a distributed background image S6, and FIG. 21C is a plan view showing a distributed background image S7; FIG. 22A is a plan view showing a composite copy image P5, FIG. 22B is a plan view showing a composite copy image P6, and FIG. 22C is a plan view showing a composite copy image P7.

DETAILED DESCRIPTION OF THE PREFERRED EMBODIMENTS

Figure 1:
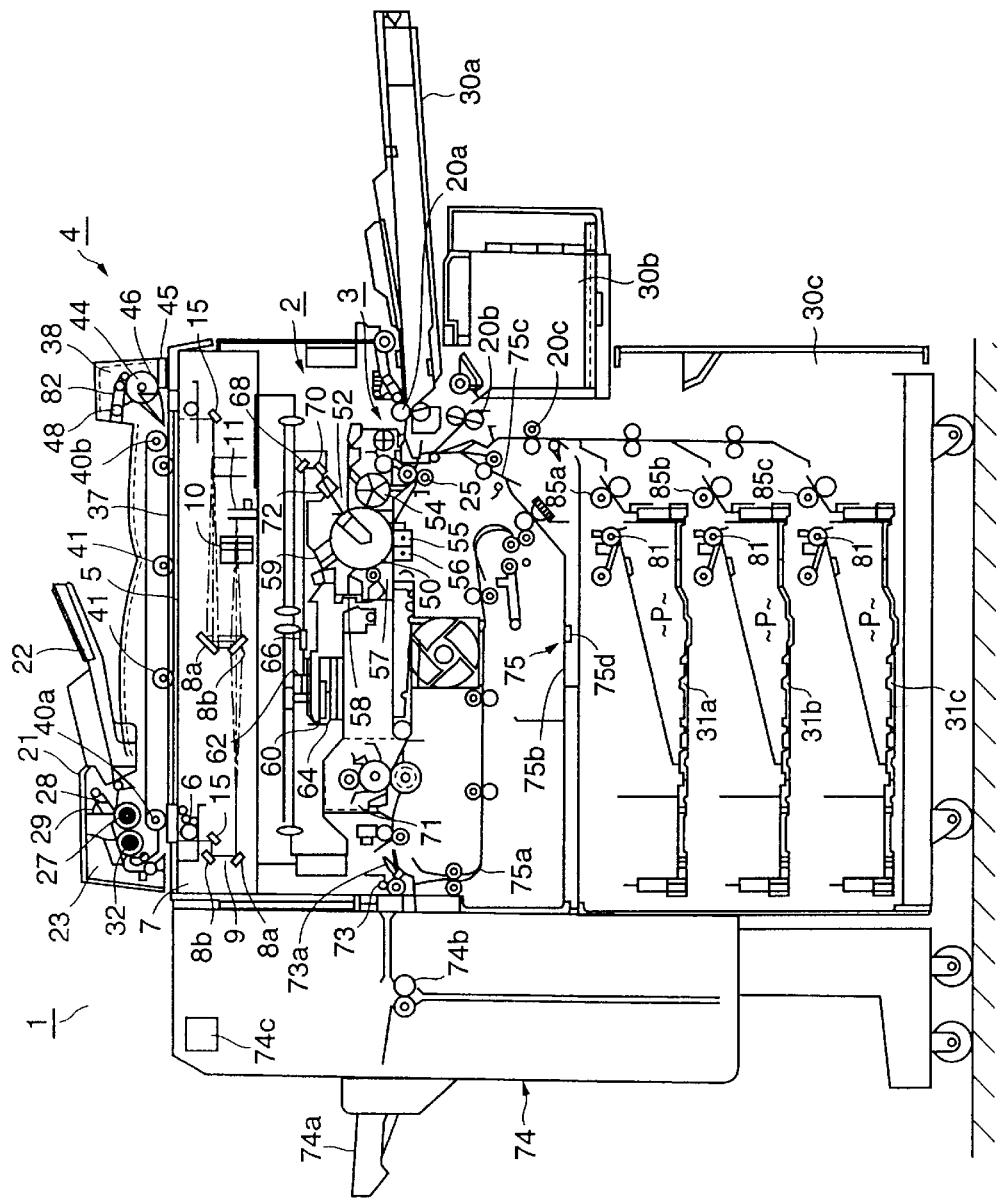
FIG. 1 is a schematic sectional view showing a system construction of a digital copier that is an embodiment of an image forming system of the present invention.
Figure 2:
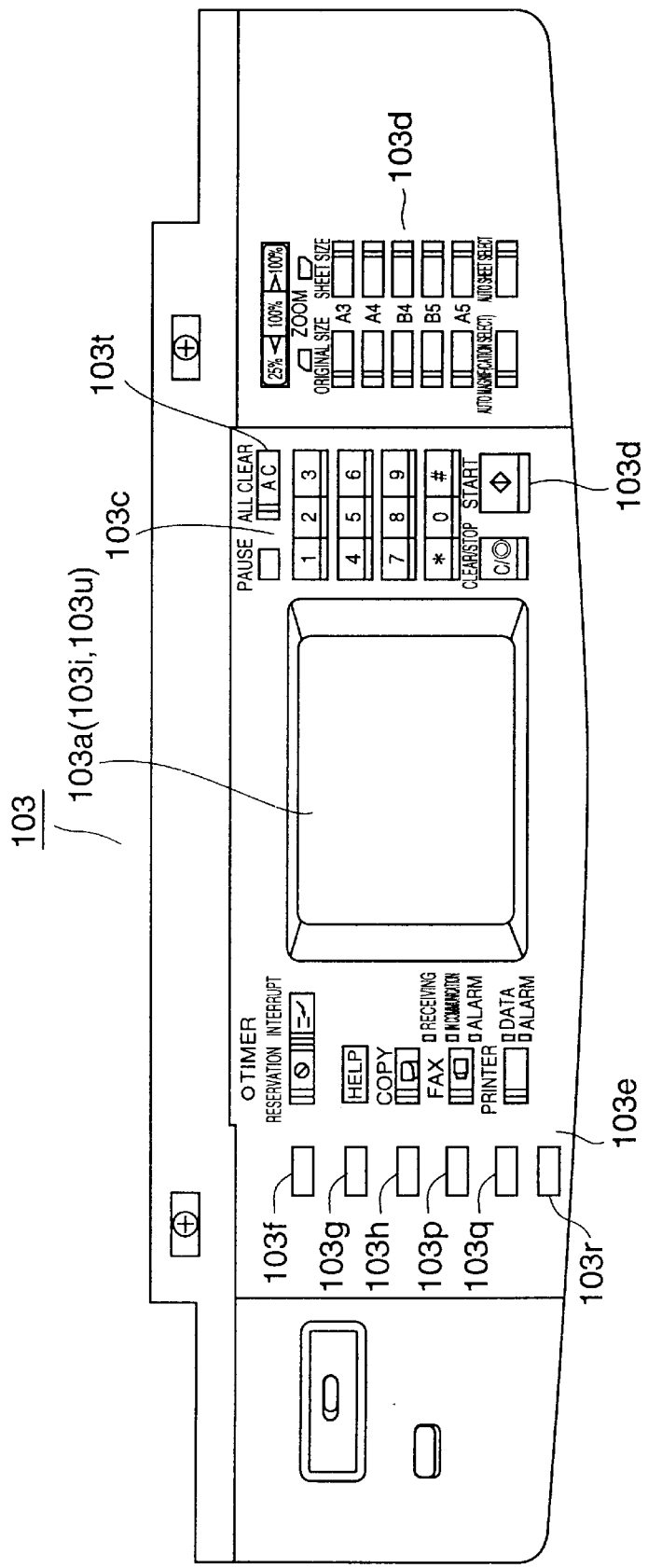
FIG. 2 is a schematic plan view showing a control panel of digital copier shown in FIG. 1.

Referring to FIG. 1 through FIG. 19, preferred embodiments of the present invention will be described below. FIG. 1 briefly shows the whole structure of a digital copier 1 as an image forming system having scanner, printer, facsimile and network functions. The digital copier 1 is equipped with a scanner unit 2 for reading a document image and a printer unit 3 for forming a developer image as an image forming means and is provided with an automatic document feeder (hereinafter referred to as ADF) on the top.

An ADF4 is installed by mounting the rear edge portion of a main cover 21 to the upper rear edge portion of the main body of the digital copier 1 via hinges (not shown) in the state wherein it is opened/closed. The top surface of a document table 5 on the top of the main body of the digital copier 1 can be opened by opening/closing the entire ADF 4 as necessary. On the region in the slightly right direction on the top of the main cover 21, there is provided a document feeding table 22 wherein plural sheets of a document can be held collectively.

Reference numeral 23 indicates a paper supply unit for picking up document sheets on the document feeding table 22 one sheet at a time. In the paper supply unit 23, there are a pick-up roller 27 for picking up a document sheet, a weighting plate 28 for pressing a document sheet against the pick-up roller 27, an empty sensor that is a document sensor for sensing the set-up state of a document on the document feeding table 22, etc. Further, in the document pick-up direction of the pick-up roller 27 of the paper supply unit 23, a paper supply roller 32 is arranged for supplying document sheets surely one sheet at a time.

Reference numeral 37 is a document conveyor belt that is a wide endless belt of a white outer surface put over a pair of belt rollers 40*a* and 40*b* and stretched on the upper surface of the document table 5. This document conveyor belt 37 is able to travel in the forward/backward directions by a belt driving mechanism (not shown). Further, on the back side of the inner circumference of the document conveyor belt 37, there are provided plural belt pressing rollers 41 for pressing the belt surface against the document table 5 and a set switch (not shown) for detecting the opening/closing state of the automatic document feeder. The document conveyor belt 37 stops a document sheet supplied by the paper supply unit 23 once at a reading position of the document table 5 and after reading time document, conveys the document in the direction of a paper discharge unit 38.

The paper discharge unit 38 is composed of a conveyor roller 44, a pinch roller 45 for pressing a document against this conveyor roller 44, a paper discharge sensor 46 for detecting the trailing edge of a document conveyed in the paper discharge direction, etc. Further, at the downstream of a document discharge path, a paper discharge roller 48 is provided. In addition, in the paper discharge path, a gate 82 is provided for leading a document to the document table 5 by turning over both sides of the document, thus enabling it to copy both sides.

The scanner unit 2 composed of an illumination lamp 6 that is a source of light, a first carriage 7 equipped with a mirror 15, a second carriage 9 equipped with mirrors 8*a* and 8*b* for bending a light path, a lens 10, a CCD sensor 11 for receiving reflecting light, a driving system (not shown) for sliding these units, and an image processing unit 107 described later for converting the output of the CCD sensor 11, which is image data, from analog data into digital data. The first and second carriages 7 and 9 are connected each other with a timing belt (not shown), and the second carriage 9 moves at a velocity of ½ of the speed of the first carriage 7 in the same direction. As a result, it is possible to scan the light path length up to the lens 10 so that it becomes constant.

The lens 10 has a fixed focal distance and is moved in the direction of optical axis when the magnification is increased. One pixel of the CCD sensor 11 corresponds to one pixel of a document. The output of the CCD sensor 11 is output to the image processing unit 107. The movement of the first and second carriages 7 and 9 is made by a stepping motor (not shown). The first and second carriages 7 and 9 are moved corresponding to the movement of a timing belt put over between a drive pulley and an idle pulley (not shown) that are connected to the rotary shaft of the stepping motor.

The lens 10 is moved in the direction of optical shaft according to the movement of the spiral shaft that is rotated by the stepping motor (not shown). Reference numeral 60 indicates a laser diode. A collimate lens 62, a polygon mirror 64, a lens 66, reflectors 68 and 70 and a lens 72 are arranged corresponding to this laser diode, and laser light is applied to a photo-conductive drum 50 from an exposure device 52.

The printer unit 3 is in combination of a laser optical system with an electro-photographic system that is capable of forming an image on a transfer paper. In other words, the printer unit 3 has the photo-conductive drum 50 that is supported rotatably nearly at the center in the digital copier 1. Around the photo-conductive drum 50, the exposure device 52, a developing device 54, a transferring charger 55, a separating charger 56, a cleaning device 57, a charge elimination lamp 58 and a main charger 59 are arranged.

The photo-conductive drum 50 is uniformly charged by the main charger 59, and laser beam is emitted from the scanner unit 2 and an electrostatic latent image is formed on the photo-conductive drum 50 based on image data. The electrostatic latent image formed on the photo-conductive drum 50 is developed by the developing device 54. The developed image is transferred by the transferring charger 55 on a sheet of paper supplied from a paper supply cassette 30*a*, a large volume paper supply cassette 30*b* and a paper supply unit 30*c* through paper supply rollers 20*a*, 20*b*, 20*c*, and an aligning roller 25.

Thereafter, the sheet of paper is separated from the photo-conductive drum 50 by the separating charger 56 and conveyed to a fixing device 71 by the conveyor belt. The sheet of paper on which a developer image is fixed by the fixing device 71 is discharged on a paper receiving tray 74*a* of a paper discharge unit 74 by a paper discharge roller pair 73. The paper discharge unit 74 has a roller pair 74*b* that faces down the sheet of paper discharged from the paper discharge roller pair 73, Further, the paper discharge unit 74 has a stapler 74c on its top to staple every copy in the staple sort mode.

On the other hand, the developer left on the photo-conductive drum 50 after separating the sheet of paper is cleaned by the cleaning device 57, and the electric charge remained on the photo-conductive drum 50 is eliminated by the charge elimination lamp 58 and next copying operation is waited. Further, when copying both sides of a sheet of paper, after completing the fixing of one side of a sheet of paper, this sheet is sorted to a conveyor path 5a side by a gate 73a and stacked in a tray 75b. The one side copied sheet of paper stacked in the tray 75b is conveyed to the transferring charger 55 synchronizing with a toner image on the photo-conductive drum 50 through a re-conveyor path 75c when the back side copy is started and the image forming operation is executed on a back side in the same manner as in the front side copy operation. Reference numeral 75d indicates a paper sensor for detecting the presence of paper on the tray 75b.

The paper supply unit 30c has cassette cases 31a–31c and conveys sheets of paper picked up by pick-up rollers 81a–81c to the paper supply roller 20c after separating by separation conveying rollers 85a–85c.

On the top of the main body of the digital copier 1, a control panel 103 is provided. On the control panel 103, there are a manual signature input device 103i that displays a copy magnification, the number of sheets to be copied or various messages, etc. and also, serves as a signature input unit capable of input information including manual signatures by user and a touch panel switch 103a that is in the dual structure with a liquid crystal display 103u. Further, the control panel 103 is provided with a start key 103b, an all clear key 103t, a ten key 103c, a paper size and magnification setting key 103d, a mode selection key 103e for designating such operation modes as copy/facsimile/printer, etc. The mode key 103e has a collation key 103f for collating a manual signature, a registration key 103g for registering a manual signature, a signature input key 103h for inputting a manual signature, a signature composing key 103p for composing a manual signature with a document image, a background composing key 103q for composing a distributed background with a document image, a document collation key 103r for collating a signature on a document image with a manual signature, etc.

Figure 3:
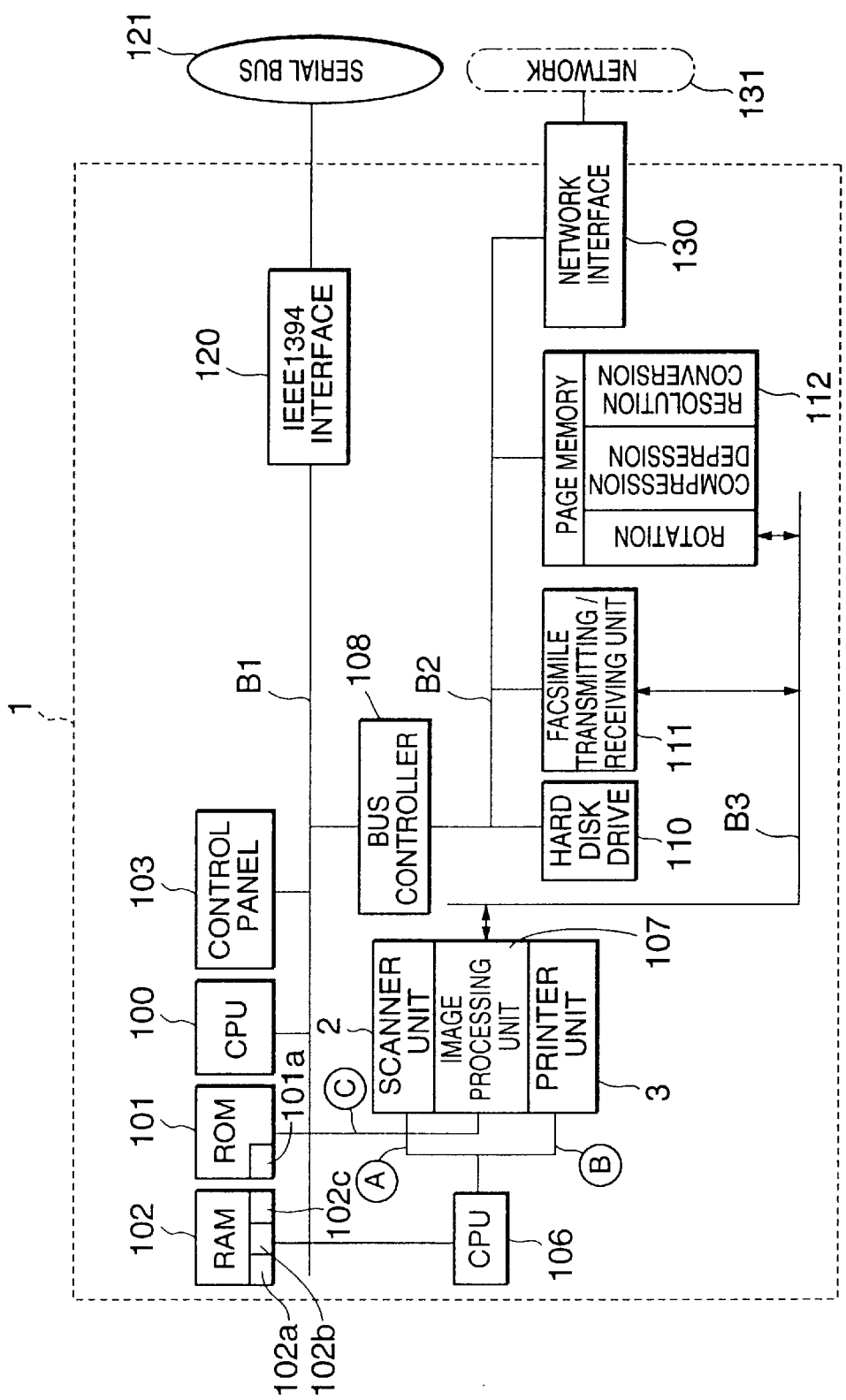
FIG. 3 is a schematic block diagram showing a system construction.

Next, the control system of the scanner unit 1, the printer unit 3 and facsimile transmitting/receiving unit 111 of the digital copier 1 will be described in detail. FIG. 3 shows the entire system structure of the digital copier 1. The digital copier 1 is connected to a main CPU 100 that controls the entirety of the digital copier 1, the control 103, a mechanism portion control CPU 106, the scanner unit 2, an image processing unit 107, the printer unit 3, a bus controller 108, a ROM 101, a RAM 102 and an IEEE 1394 interface 120 that is connected to a serial bus 121 by a control bus B1. In the ROM 101, a standard background 101a that can be composed with a document image is stored and in the RAM 102, a user table 102a storing a registered user manual signature, and a user log file 102c storing the contents of a document from which user formed an image, the number of copies, size, etc. are stored and further, a user reserved background 102b that can be composed with a document image is stored.

Further, a bus controller 108 is connected to a network interface 130 that is connected to a hard disk drive 110, the facsimile transmitting/receiving unit 111, a page memory 112 and a network 131 through a control bus B2. Further, the image processing unit 107, the printer unit 3, the facsimile transmitting/receiving unit 111 and the page memory 112 deliver image data through an image bus B3. Further, image data also can be delivered by the hard disk drive 110, the page memory 112, the facsimile transmitting/receiving unit 111 and the network interface 130 through the control bus B2. The page memory 112 stores image data that are rotated, compressed, depressed and resolution converted. Further, the scanner unit 2, the printer unit 3 and the facsimile transmitting/receiving unit 111 operate independently.

Figure 4:
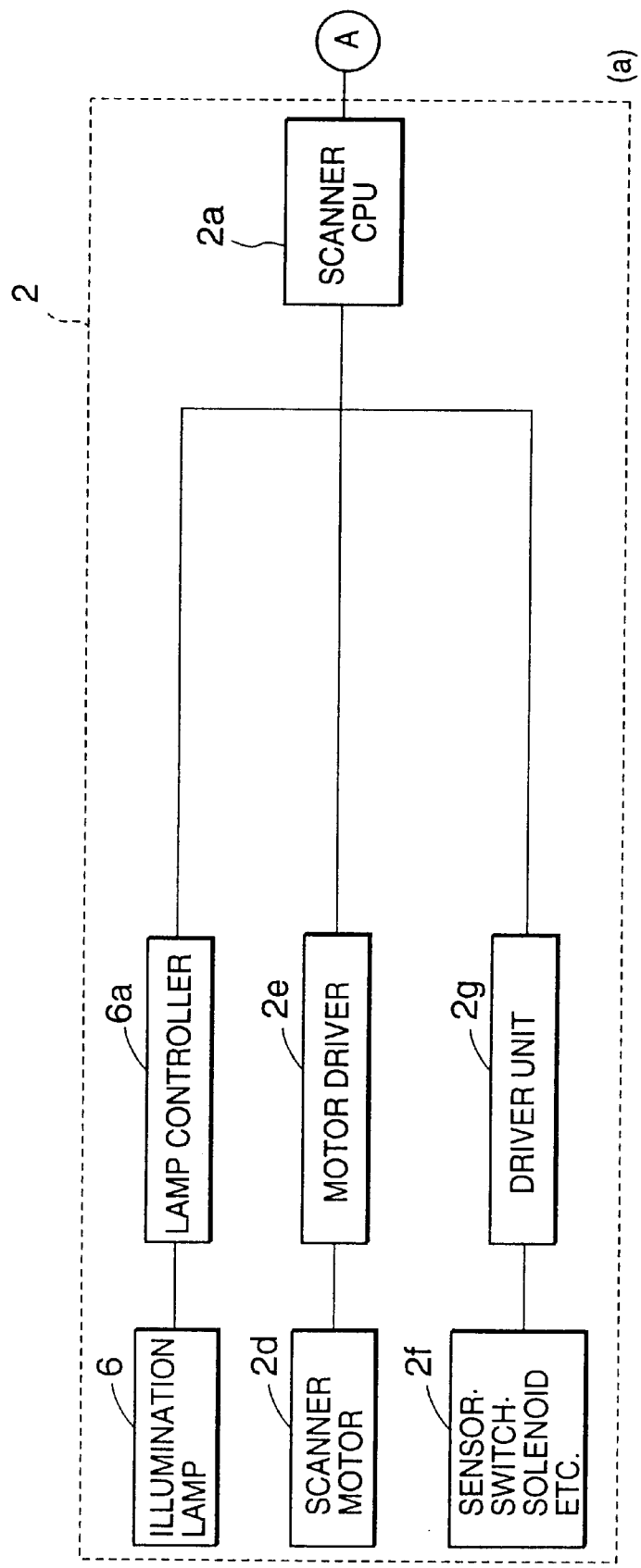
FIG. 4 is a schematic block diagram showing a scanner unit.

Next, referring to FIG. 4, the detail constructions of the scanner unit 2 and the image processing unit 107 are described. A scanner CPU 2A of the scanner unit 2 is connected to a lamp controller that controls the illumination lamp 6, a motor driver 2e that controls a scanner motor 2d, and a driver unit 2q that controls the drive of a sensor, switch, solenoid, etc. 2f and controls these units.

Figure 5:
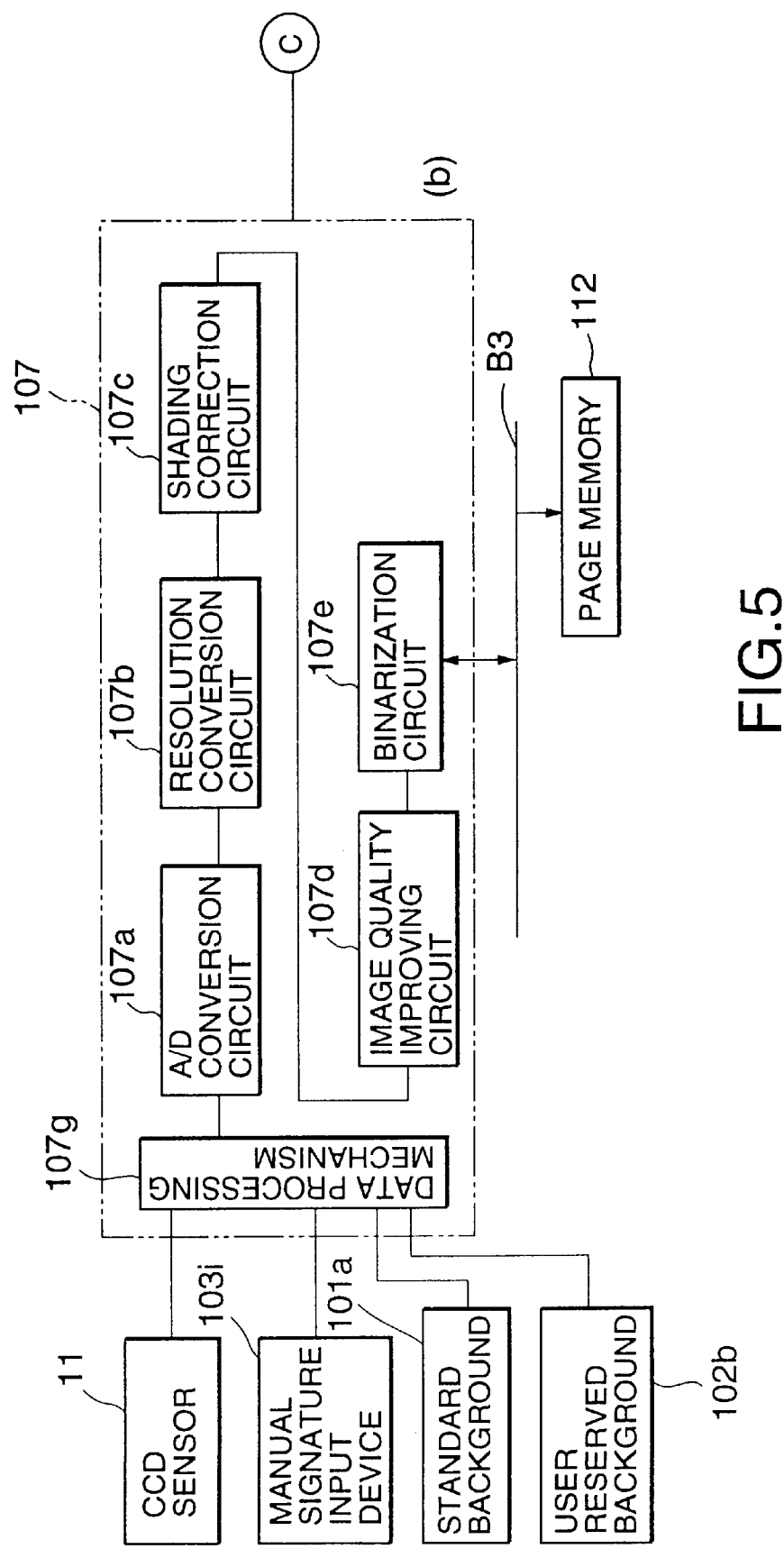
FIG. 5 is a schematic block diagram showing an image process unit.

Next, referring to FIG. 5, the construction of the image processing unit 107 is described. The CCD sensor 11, the manual signature input device 103i, the standard background 101a, and the user reserved background 102b are connected to a data processing mechanism 107g so as to compose or separate data output therefrom. The data output from the data processing mechanism 107g is processed by an A/D conversion circuit 107a, a resolution conversion circuit 107b, a shading correction circuit 107c, and image quality improving circuit 107d and a binarization circuit 107e and converted into binary data. That is, image data read by the CCD sensor 11 is sent to the page memory 112 from the binarization circuit 107e of the image processing unit 107 through the image bus B3 and stored therein.

Figure 6:
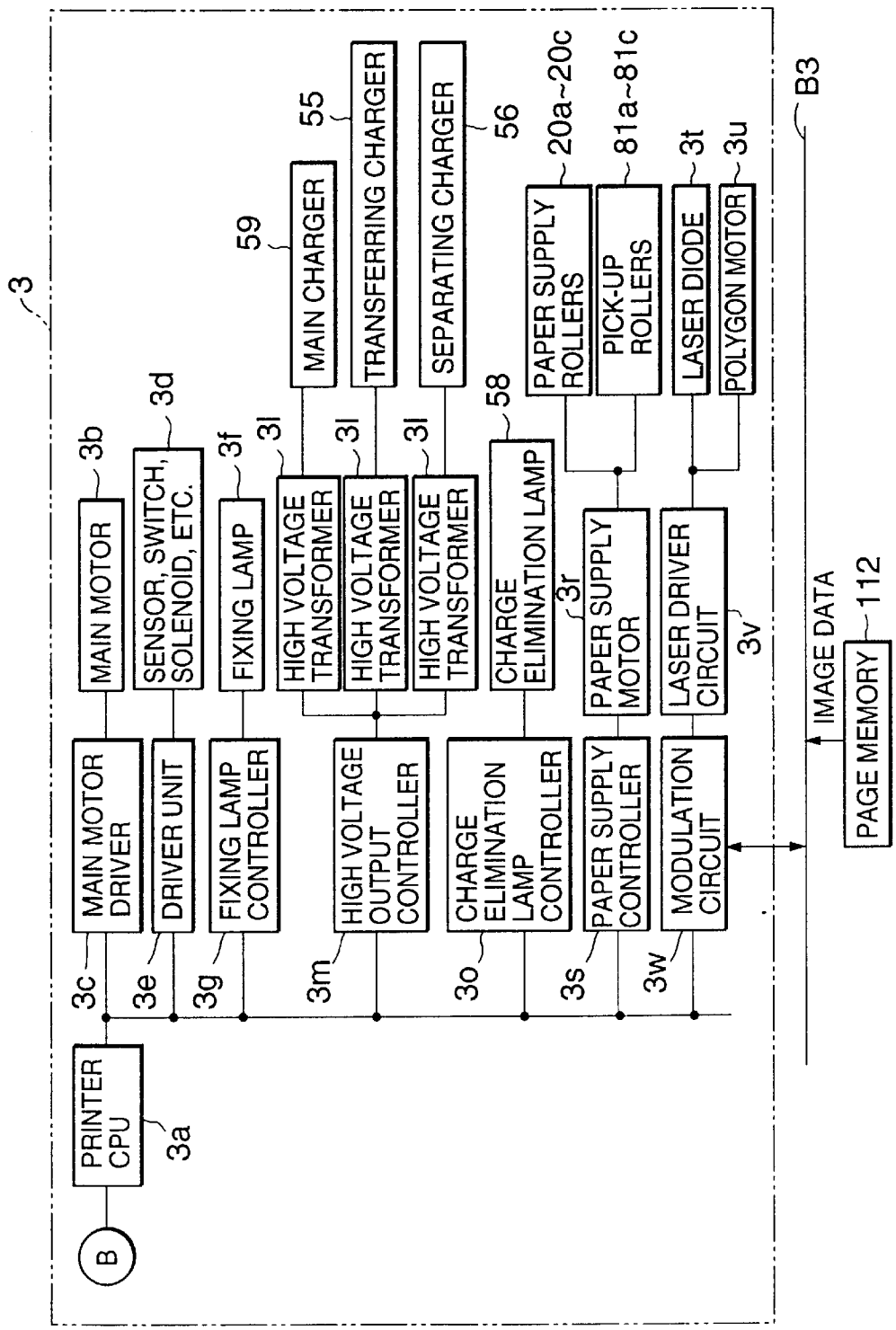
FIG. 6 is a schematic block diagram showing a printer unit.

Next, referring to FIG. 6, the construction of the printer unit 3 is described. A printer CPU 3a of the printer unit 3 is connected to a main motor driver 3c that drives a main motor 3b, a driving unit 3e that drives and controls a sensor, switch, solenoid, etc., a fixing lamp controller 3g that controls a fixing lamp 3f, a high voltage output controller 3m that controls the main charger 59, the transferring charger 55 and the separation charger 56 via respective high voltage transformer 31, a charge elimination lamp controller 3o that controls the charge elimination lamp 58, the paper supply rollers 20a–20c, a paper supply controller 3s that controls a paper supply motor 3r for the pick-up rollers 81a–81c and a modulation circuit 3w that drives a laser driver circuit 3v for a laser diode 3t and a polygon motor 3u, and controls these units. By the printer unit 3 in this structure, image data sent from the page memory 112 through the image bus B3 is copied on a prescribed paper under the control of the printer CPU 3a.

Figure 7:
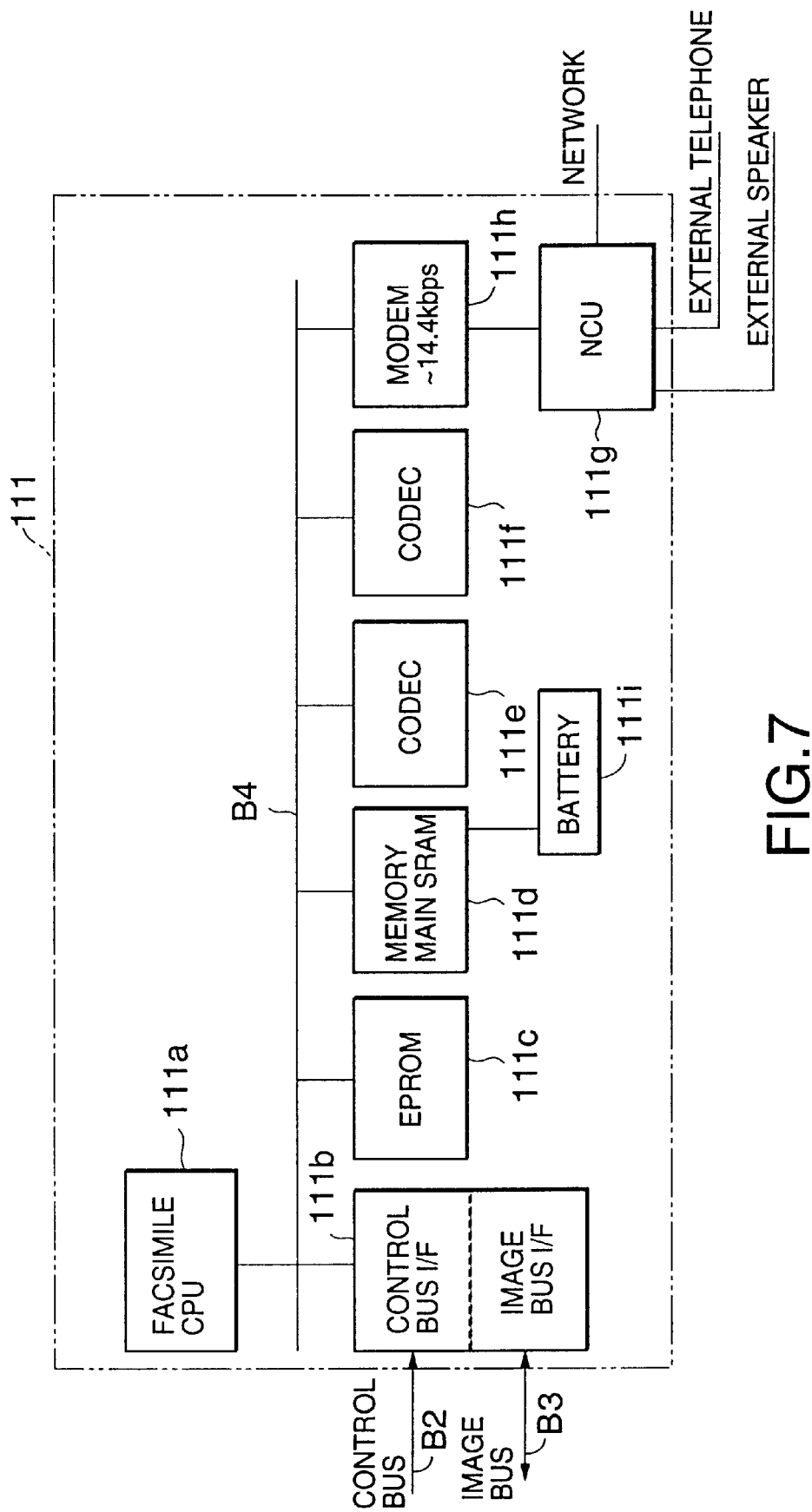
FIG. 7 is a schematic block diagram showing a facsimile transmitting/receiving unit.

Next, referring to FIG. 7, the detailed construction of the facsimile transmitting/receiving unit 111 is described. A facsimile CPU 111a of the facsimile transmitting/receiving unit 111 is connected to an interface control circuit 111b comprising a control bus interface and an image bus interface, a memory EPROM 111c storing a control program, a memory main SRAM 111d storing image data, a CODEC (for input/output) 111e for compresses/depresses image data when image data is input/output, a CODEC (for transmitting/receiving) for compressing/expanding when image data is transmitted/received, a communication line and a MODEM (14.4 kbps) 111h for modulation/demodulation when transmitting/receiving data through an NCU 111g that controls a public network and controls them. A battery 111i is connected to the memory main SRAM 111d.

In the facsimile transmitting/receiving unit 111 in this structure, image data transmitted through the page memory 12 and the image bus B3 is processed including compression, etc. and output to a communication line, and image data received through the communication circuit is processed including depression, etc. and transmitted to the page memory 12 through the image bus B3 and temporarily stored therein.

Figure 8:
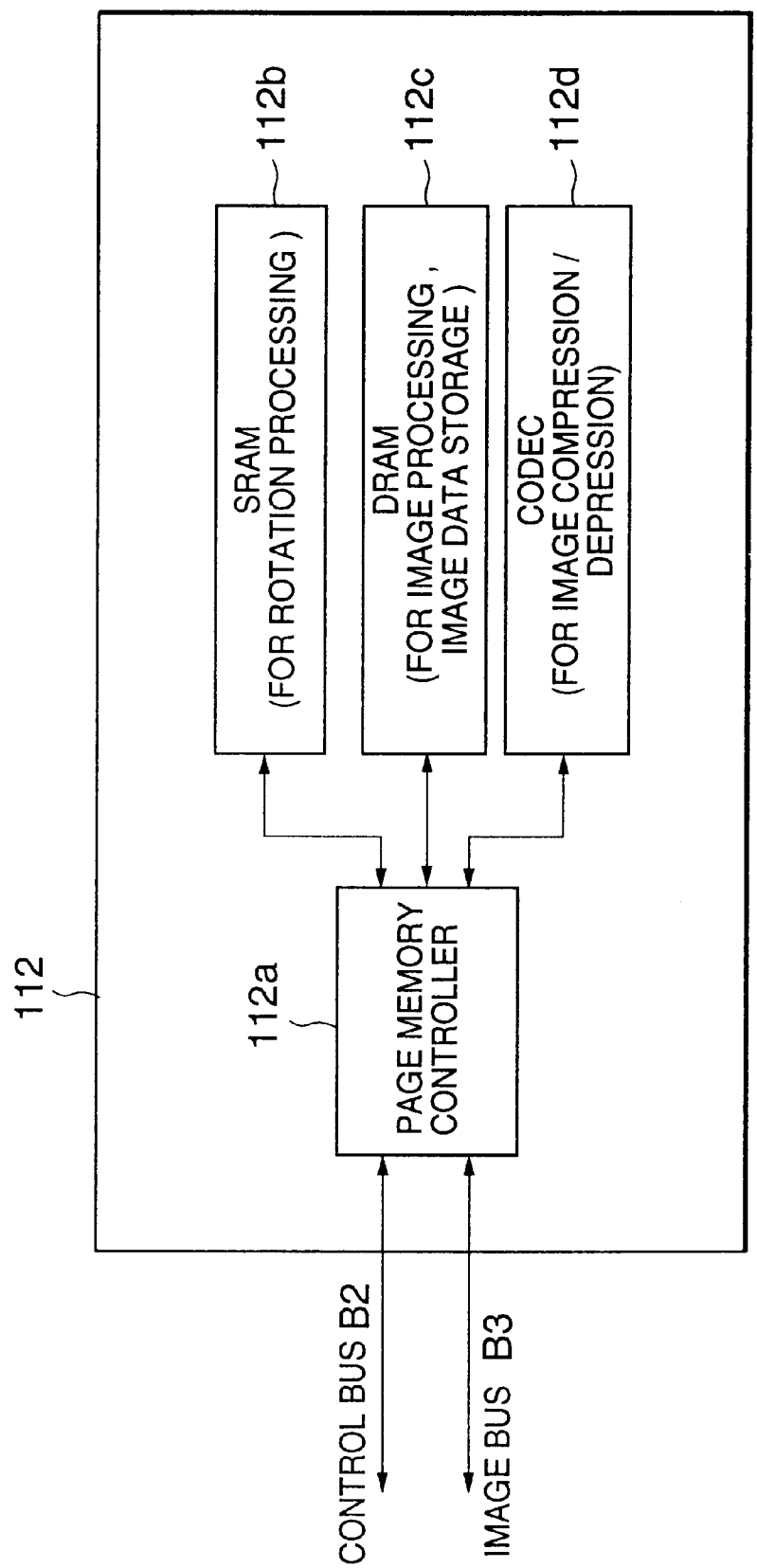
FIG. 8 is a schematic block diagram showing a page memory.

Next, referring to FIG. 8, the construction of the page memory 112 is described. The page memory 112 is provided with a SRAM 112b for the rotation processing, a number of DRAM 112c for the image processing and image data storage, and an image compression/depression LSI is provided with a CODEC 112d. All of them are connected to and controlled by a page memory controller 112a. Further, the page memory controller 112a is also connected to both the control bus B2 and the image bus B3 and mediates the access to the page memory 112 through the control bus B2 and the image bus B3.

The image processing including compression, depression, rotation and composition of image data on the page memory 112 is achieved by the main CPU 100 by controlling a page memory controller 112a via the bus controller 108 and the control bus B2. Further, the image data on the page memory 112 can be accessed through both the control bus B2 and the image bus B3, and the access mediation work is executed by the page memory controller 112a.

Figure 9:
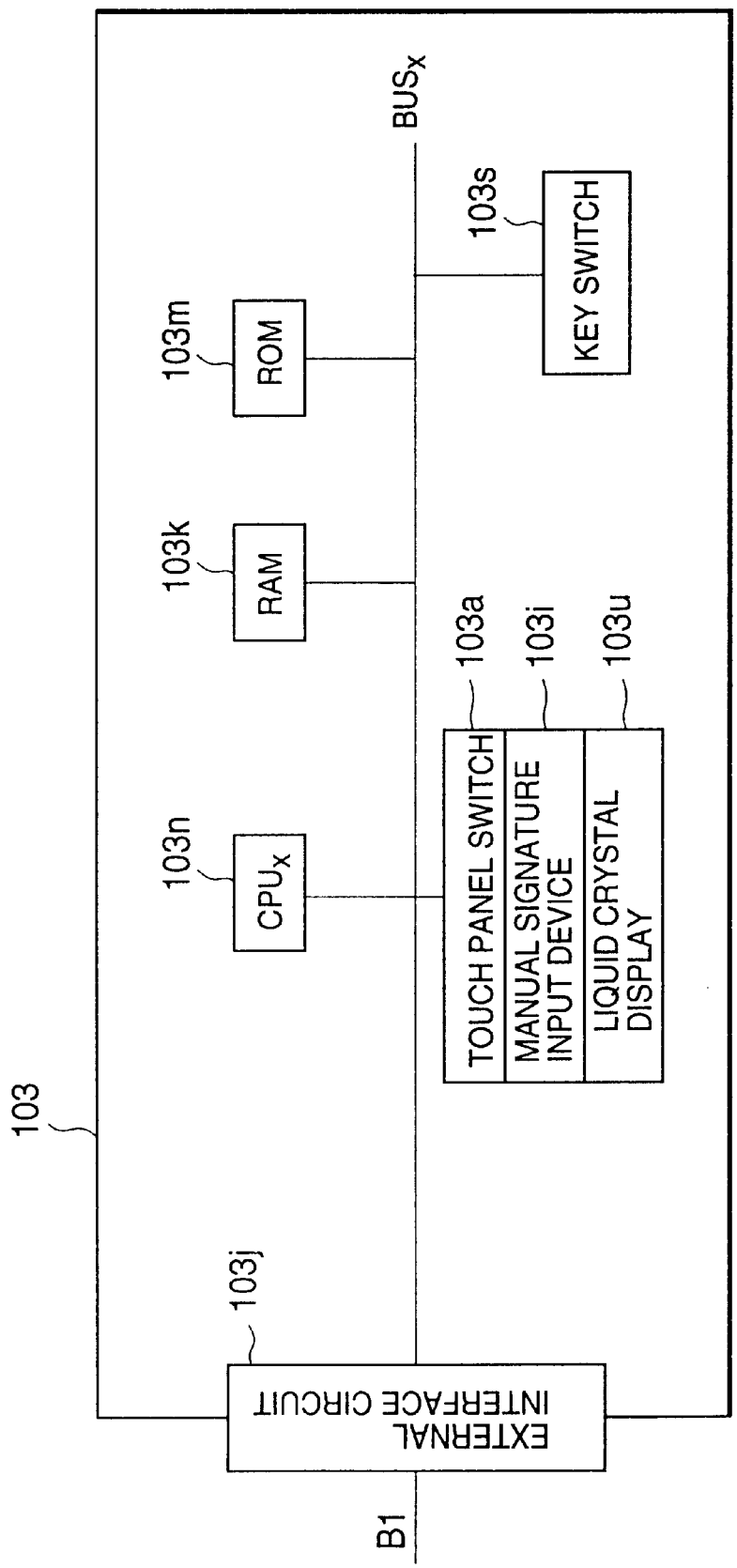
FIG. 9 is a schematic block diagram showing a control panel.
Figure 10:
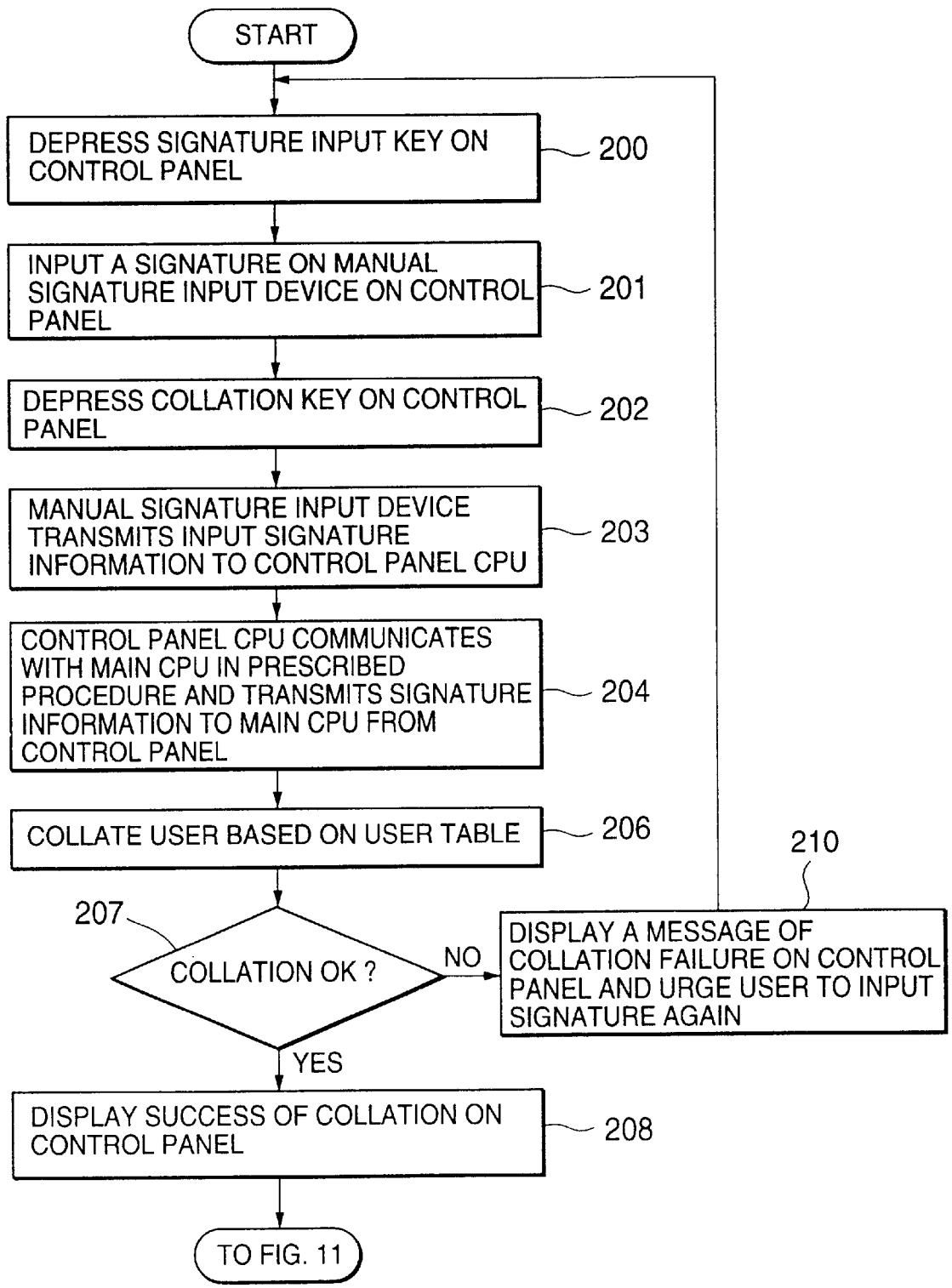
FIG. 10 is a part of a flowchart when performing the image formation.

Next, the construction of the control panel 103 is described using FIG. 9. On the control panel 103, a touch panel switch 103a that also serves as the manual signature input device 103i and the liquid crystal display 103u, a key switch 103s comprising the start key 103b, the ten key 103c, the paper size and magnification setting key 103d, the mode selection key 103e, the collation key 103f, the registration key 103g, the signature input key 103h, etc., an external interface circuit 103j that is connected to the control bus B1, the RAM 103k and the ROM 103m are connected to a control panel CPUx 103n through a bus x.

The ROM 103m stores a program to control equipment on the control panel 103 and the RAM 103k is the operating area of this program. The touch panel switch 103a performs the duties as a software key and acts as an interface with user. Further, the touch panel switch 103a is in the dual structure of the manual signature input device 103i and the liquid crystal display 103u and displays instructions and alarms to user according to the control program stored in the ROM 103m.

The external interface circuit 103j is a communication circuit between the main CPU 100 and the control panel 103. The main CPU 100 and the control panel 103 exchange data including commands, status and manual signature information according to the prescribed procedure through this external interface circuit 103j.

The manual signature input device 103i of the touch panel switch 103a converts an input manual signature into electronic data. At this time, the manual signature input device is able to obtain such information as the writing sequence and writing pressure of user signature, etc. from the sensor, convert all information obtained into electronic data and transmit to the control panel CPUx 103n.

Next, the actions are described. First, a case wherein an image is formed using this digital copier 1 is explained referring to flowcharts shown in FIG. 10 and FIG. 11. When starting the copying, in Step 200 user depresses first the signature input key 103h on the control panel 103. At this point of time, the manual signature input device 103i on the control panel 103 becomes the input waiting state.

Next, user inputs a manual signature through the touch panel switch 103a in Step 201. Then, going to Step 202, he depresses the collation key 103f. As a result, in Step 203 the control panel CPUx 103n obtain electronic data relative to the user manual signature from the manual signature input device 103i in Step 203. Then, in Step 204 the control panel CPUx 103n communicates with the main CPU 100 according to the prescribed procedure and transmits this electronic data relative to the manual signature to the main CPU 100 through the external interface circuit 103j.

Then, in Step 206 the main CPU 100 collates the electronic data relative to the manual signature received from the control panel CPUx 103n with the registered user manual signature data stored in the user table 102a (Step 207). When both data agreed with each other as a result of the collation, the operation proceeds to Step 208 and the Main CPU 100 communicates with and conveys the agreement to the control panel CPUx 103n according to the prescribed procedure. The control panel CPUx 103n displays a message that the collation is completed and the copy can be made on the touch panel switch 103a. When both data did not agree with each other as a result of the collation in Step 207, the operation proceeds to Step 210 and the main CPU 100 communicates with and conveys the disagreement to the control panel CPUx 103n according to the prescribed procedure and displays a message that the both data did not agree with each other and urges the input of the manual signature again.

When both data agreed as a result of the collation by user, the operation proceeds to Step 211, the CPU 100 creates the user log file 102c on a hard disc 110, the digital copier 1 is allowed for use by that signed user and the image forming operation is enabled. The user log file 102c is able to manage users who used the digital copier 1 and the contents of this user log file 102c comprise such managing information as names of users who used the digital copier 1, dates started to use, a time of use, a paper size and the number of sheets used for copying, image data with decreased amount of information, etc.

Then, the operation proceeds to Step 212 and when the user collation result agreed and there was no input for 30 seconds, the operation proceeds to Step 223, the user log file 102c is closed and the digital copier 1 automatically returned to the initial state, that is, the user collation waiting state. In this case, to reuse the digital copier 1, it becomes necessary to input a manual signature again and make the collation by user.

Figure 12:
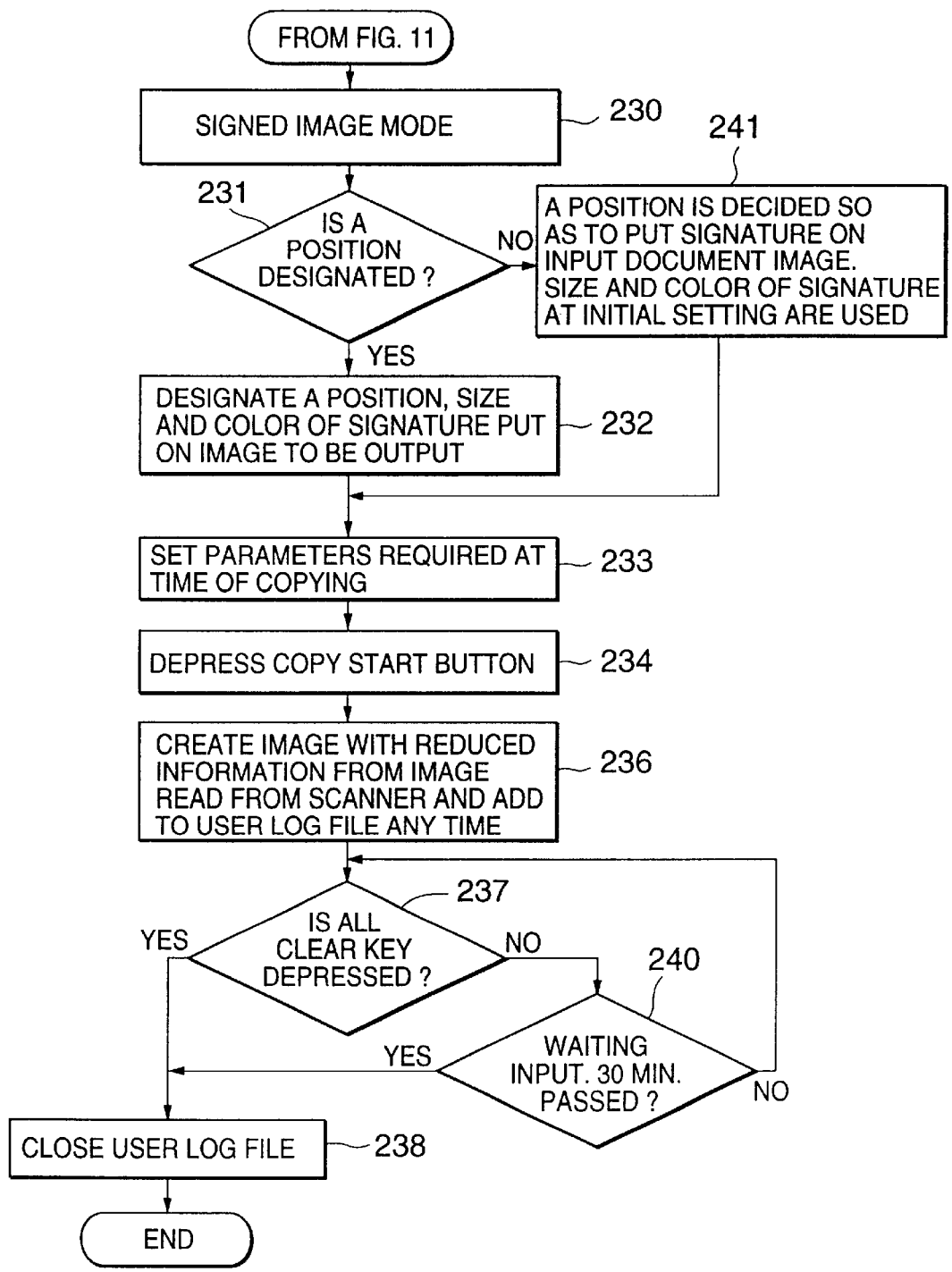
FIG. 12 is a flowchart when copying an image with a manual signature shown in A in the flowchart in FIG. 11 when performing the image formation.
Figure 14:
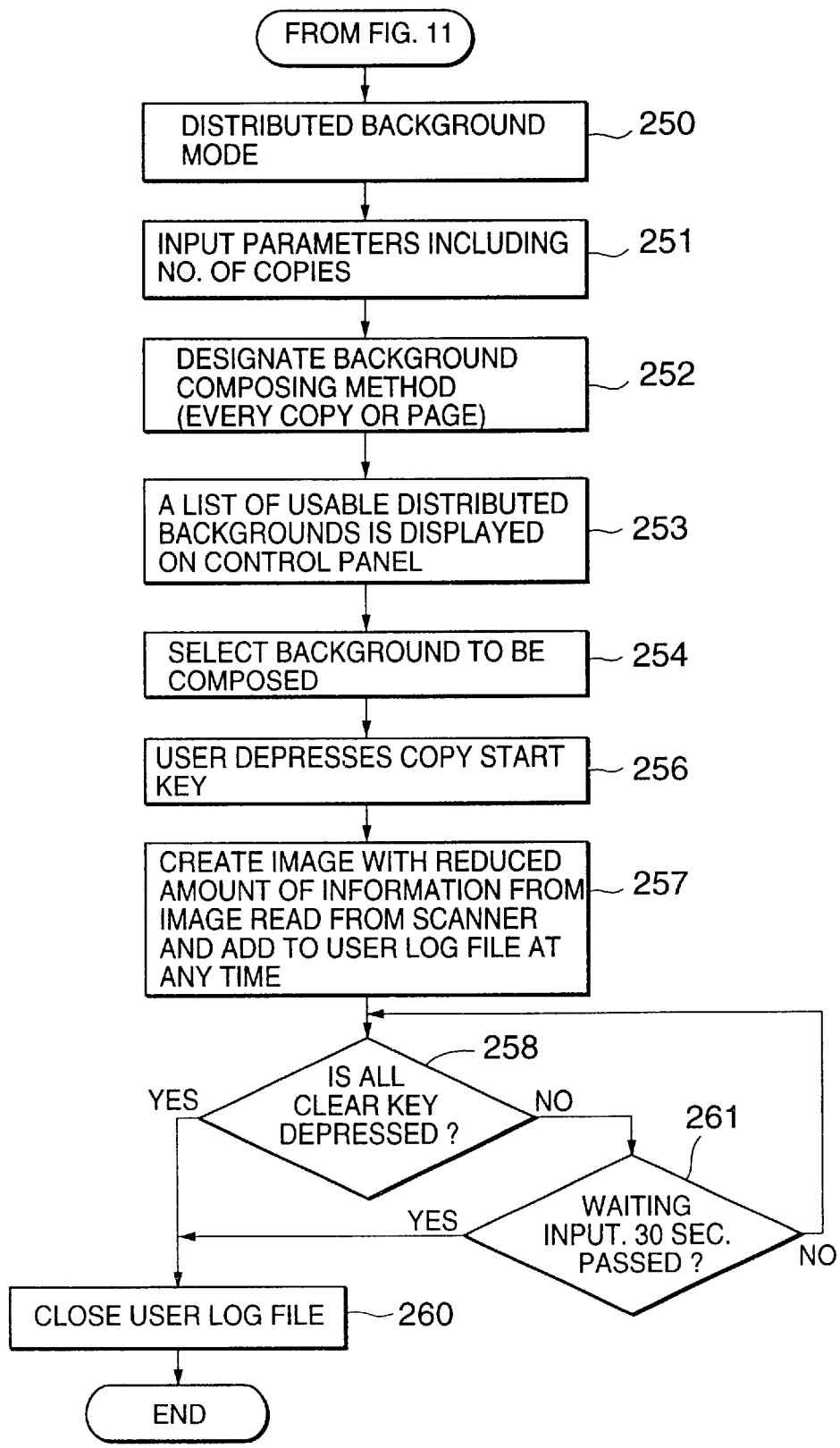
FIG. 14 is a flowchart when making a distributed background composite copy shown in B of the flowchart shown in FIG. 11 when performing the image formation.

When the signature composing key 103p is depresses in Step 213 before 30 seconds passes in Step 212, the operation proceeds to Step 230 shown in FIG. 12 in order to form a copied image with a signature. Or when the background composing key 103q is depressed in Step 214 before 30 seconds passed in Step 212, the operation proceeds to Step 250 shown in FIG. 14 in order to form a copied image with the background composed.

Further, to perform the copying without composing a signature or a background, when user inputs required copying conditions, etc. in Step 216 before 30 seconds passed in Step 212 and after setting a document on the ADF4 or the document table 5, depresses the start key 103b, the operation proceeds to Step 218. In Step 218, the copying operation is started and a document image that is read from the scanner unit 2 is transferred onto the page memory 112 through the image bus B3. The page memory controller 112a compresses this image data by controlling the CODEC 112d. Then, this compressed image data is stored in the hard disc 110.

The compressed image data stored in the hard disc 110 is read out again on the page memory 112 and depressed by the page memory controller 112a by controlling the CODEC 112d. The depressed image data is sent to the printer unit 3 through the image bus B3. An electrostatic latent image formed on the photo-conductive drum 50 is transferred on a sheet of paper after developed and a required copy is obtained through the ordinary electro-photographic process wherein a toner image transferred on a sheet of paper is fixed. When plural sheets of copy are needed, the depressed image data is output to the printer unit 3 repeatedly by the required number of copies. Further, if an electronic sorting is designated, such the operation that a depressed image is read out of the hard disc 110 in the page sequence and sent to the printer unit 3 is repeated by the designated number of copies.

At the same time, in Step 218 the image data read and compressed from the scanner unit 2 is stored in the hard disc 110 and at the same time, image data in a size reduced to about one-tenth by reducing amount of information is created on the page memory and added to the user log file 102c that is created in Step 211.

Thus, when the copy operation is completed, information finally deciding the number of sheets to be copied is added to the user log file 102c. Hereafter, when an all clear key 103t is depressed in Step 220, the operation proceeds to Step 221 and the user log file 102c is closed and the approval to use the digital copier 1 is terminated. Further, even when the all clear key 103t is not depressed, if there is no input for 30 seconds in Step 222 after completing the copy operation, the operation proceeds to Step 221 and the user log file 102c is closed and the approval to use the digital copier 1 is terminated.

Thus, unless a manual signature agrees with the registered user's manual signature, user is not able to use the digital copier 1 and therefore, the possibility for the illegal use of the digital copier 1 can be reduced and secrecy of image information can be improved. Furthermore, secrecy and reliability of image information are further improved by specifying a user from a manual signature when the copy was made using the digital copier 1 and by recording and managing what a document is, how many and what size of sheets are copied in the user log file 102c.

Next, how to get a signed copy will be described in detail. When the signature composing key 103p is depressed in Step 213, the operation proceeds to Step 230 as shown in FIG. 12 in order to form a signed image. When the signed copy mode is set up in Step 230 and a position of a signature is designated in Step 231, the operation proceeds to Step 232 and after designating a position, size and color of a manual signature to be entered in a copied image, the operation proceeds to step 233. At this time, it is possible to designate the portion of manual signature information in a specific color while leaving a document image portion in as-is color.

On the other hand, when a signature position was not designated, the operation proceeds to Step 241 and after designating the composition of a manual signature information in an input document image at a prescribed position, size and color according to the initial setting, the operation proceeds to Step 233.

In Step 233, input required copy conditions, etc. and set a document on the ADF 4 or the document table and depress the start key 103b. Then, proceed to Step 236. In Step 236, the copy operation starts and a signature composed image P1 shown in FIG. 13C is transferred onto the page memory 112 through the image bus B3 as an image data. This signature composed image P1 was composed of a document G1 read from the scanner unit 2 as shown in FIG. 13A and a manual signature S1 input through the touch panel switch 103a and shown in FIG. 13B and processed in the data processing mechanism 107g. The page memory controller 112a compresses this image data by controlling the CODEC 112d. This compressed image data is stored in the hard disc 110.

This compressed image data stored in the hard disc 110 is read out again on the page memory 112 and depressed by the page memory controller 112a by controlling the CODEC 112d. The depressed image data is sent to the printer unit 3 through the image bus B3 and an electrostatic latent image formed on the photo-conductive drum 50 is transferred on a sheet of paper after developed and after the ordinary electro-photographic process to fix a toner image on the sheet of paper, a copy is obtained. When plural copies are needed, this depressed image data is output to the printer unit 3 repeatedly by the required number of copies.

Further, when the electronic sorting is designated, an operation wherein a compressed image from the hard disc 110 is read out in page sequence, depressed by the page memory 112 and sent to the printer unit 3 is repeated by the number of designated copies.

In Step 236, at the same time when storing an image data of a compressed signature composed image in the hard disc 110, an image data in an image size reduced to one-tenth by reducing the amount of information is created on the page memory and added to the user log file 102c that is created in Step 211.

When the copy operation is thus completed, information to finally decide the number of sheets to be copies is added to the user log file 102c. Thereafter, when the all clear key 103t is depressed in Step 237, proceeding to Step 238, the user log file 102c is closed and the approved use of the digital copier 1 is terminated. Further, even when the all clear key 103t is not depressed, if there is no input for 30 seconds after completing the copy operation in Step 240, proceed to Step 238 and closing the user log file 102c, the approved use of the digital copier 1 is terminated.

When image information is formed by composing a manual signature with document information when an image is copied as described above, a signature of a person who copied an image is added to the image information. Therefore, unlimited copy by user can be restricted to a certain extent and aecrecy of the copied image information can be improved.

Next, the operation to get a distributed background composing copy will be described in detail. When the background composing key 103q is depressed in Step 214, the operation proceeds to Step 250 shown in FIG. 14 in order to form a distributed background composed copy image. In Step 250, a distributed background composed copy mode is set up. Then, in Step 251 input required copy conditions, etc. and further, in Step 252 designate a composing method to change a background image that is used for the composition for every copy or every page.

The distributed background composition for every copy denotes that a common distributed background image is composed for each copied group. For instance, when an input document of 15 sheets is formed in 3 copies (Group 1, 2, 3), copies images in 15×3 sheets are produced. According to this designation method, a distributed background image differs for each group (Ground 1, 2, 3) and for the same group copy images (Pages 1–15), the same distributed background image is used.

In the distributed background formation for every page, a distributed background differs for each page in the same group but for the same pages, the same distributed background is formed for the number of copies. Likewise the above, when an input document of 15 sheets is formed in 3 copies (Group 1, 2, 3), copies images of 15×3 sheets are produced. According to this designation method, on the same pages even when the number of copies (group) are different, the same distributed background image is used. In this method, distributed background images in the number of document sheets become necessary.

Next, in Step 253 a list of standard distributed background images stored in a standard background 101a that is provided to the digital copier as a standard and user distributed background images stored in the user reserved background 102b that is held by each user is displayed on the touch panel switch 103a. Then, user proceeds to Step 254 and selects a background to be composed on the touch panel switch 103a and after setting a document on the document table 5, depresses the start key 103b in Step 256 and proceeds to Step 257.

Figures 15A, 15B:
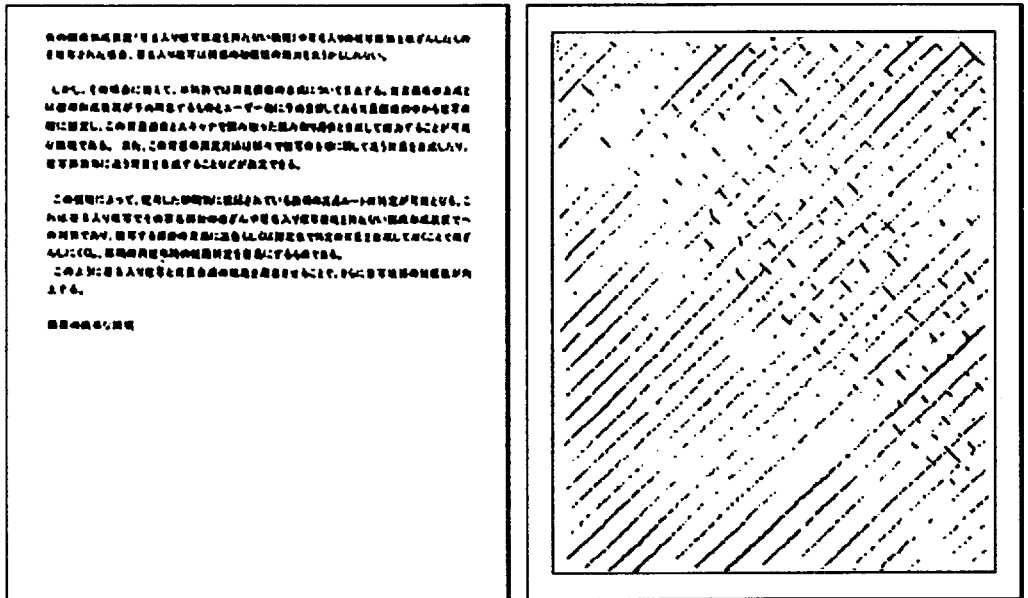
FIG. 15A is a plan view showing a document.
FIG. 15B is a plan view showing a background image.
Figure 15C:
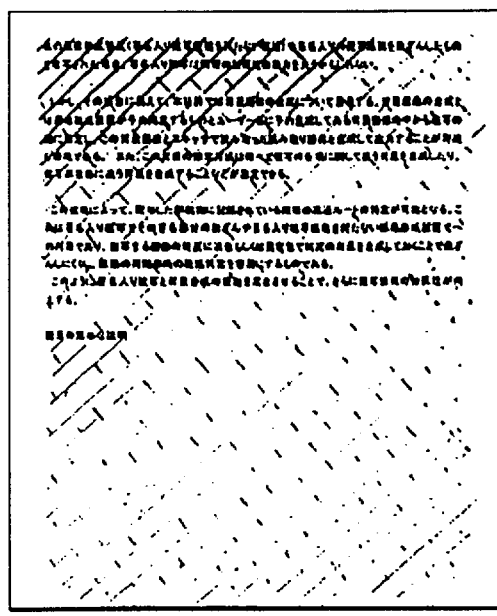
FIG. 15C is a plan view showing a distributed background composite image.

In Step 257, the copy operation is started and a distributed background composed image P2 shown in FIG. 15C, that is composed in the data processing mechanism 107g is transferred onto the page memory 112 as an image data through the image bus B3. This distributed background composed image P2 is composed of a document G2 that was read from the scanner unit 2 and shown in FIG. 15A and a background image S2 that is selected on the touch panel switch 103a and shown in FIG. 15B. The page memory controller 112a compresses this image data by controlling the CODEC 112d. This compressed image data is stored in the hard disc 110.

This compressed image data stored in the hard disc 110 is read out again on the page memory 112 and depressed by the page memory controller 112a by controlling the CODEC 112d. The depressed image data is sent to the printer unit 3 through the image bus B3 and an electrostatic latent image formed on the photo-conductive drum 50 is transferred on a sheet of paper after developed and after the ordinary electro-photographic process to fix a toner image on the sheet of paper, a copy is obtained. When plural copies are needed, this depressed image data is output to the printer unit 3 repeatedly by the required number of copies.

In Step 257, at the same time when storing an image data of a compressed signature composed image in the hard disc 110, an image data in an image size reduced to one-tenth by reducing the amount of information is created on the page memory and added to the user log file 102c that is created in Step 211.

When the copy operation is thus completed, add information to finally decide the number of sheets to be copied to the user log file 102c. Thereafter, when the all clear key 103t is depressed in Step 258, the operation proceeds to Step 260, the user log file 102c is closed and the approved use of the digital copier 1 is terminated. Further, even when the all clear key 103t is not depressed, if there is no input for 30 seconds after completing the copy operation in Step 261, the operation proceeds to Step 260, the user log file 102c is closed and the approved use of the digital copier 1 is terminated.

When an image information is formed by composing a distributed background with a document information when copying an image as described above, it is possible to form an original image information by changing a background image for every copy or page and therefore, even when secondary copies were illegally prepared by a person or party to which a copy is distributed for redistribution using a conventional copying machine having no manual signature collation function, etc., it becomes possible to search the distribution route.

It is also possible to alter a background image in order to conceal the distribution route when preparing secondary copies illegally. However, when a background image is altered, the alteration of a background image tends to become more clearly visible than the manual signature portion of an image information composed with the manual signature and it is easily judged that the background image was altered.

Figure 16:
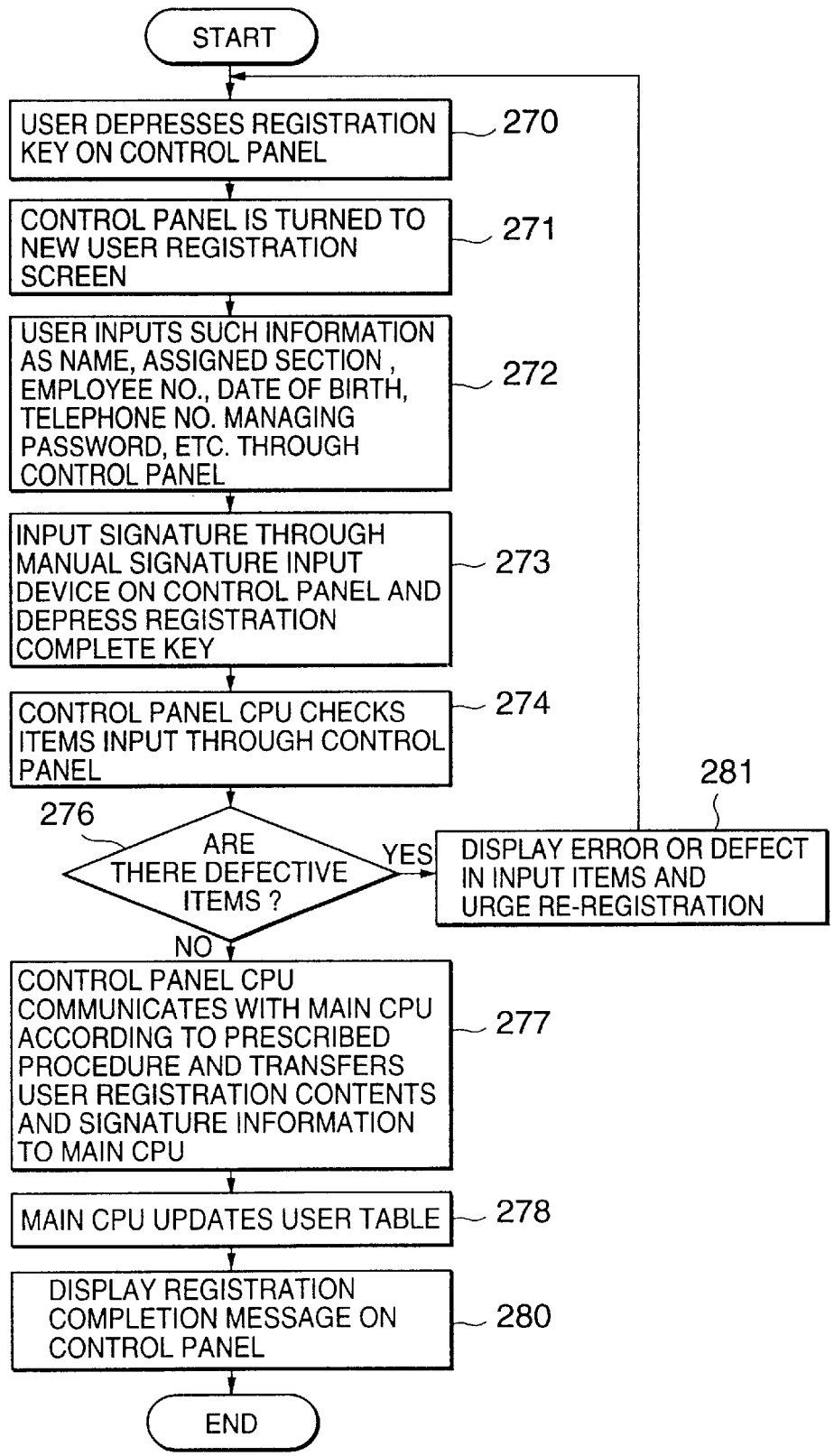
FIG. 16 is a flowchart when newly registering a user's manual signature.

Next, the new registration of a user's manual signature is explained using a flowchart shown in FIG. 16. To newly register a manual signature, user depresses the registration key 103q in Step 270. The digital copier 1 is placed in the registration mode and the display of the touch panel switch 103a becomes the user registration screen. On the screen of the touch panel switch 103a, a message is displayed to input such information to readily specify user as name, assigned section, employee number, data of birth, telephone number, management password, etc. through the touch panel switch 103a.

Next, in Step 272, user who is newly registered inputs the substance of registration through the touch panel switch 103a according to the message displayed on the touch panel switch 103a. And finally, a user inputs his manual signature through the touch panel switch 103a using a touch pen (not shown), completes the registration by depressing the registration key 103a again and proceeds to Step 274. In Step 274, items that are input through the touch panel switch 103a are checked on the control panel CPUx 103n, in Step 276, when the items are correct, the operation proceeds to Step 277 and if the items are defective, proceeds to Step 281 and displays the defectiveness on the touch panel switch 103a and urges to make the re-registration.

In Step 277, the control panel CPUx 103n communicates with the main CPU 100 in the prescribed procedure and the registration information input by user and the manual signature information converted into electronic data by the manual signature input device 103i are transmitted to the main CPU 100 through the external interface circuit 103j, and in Step 278 the main CPU 100 adds a new user to the usr table 102a based on the received registration information and the manual signature information. When completing the update of the user table 102a, the operation proceeds to Step 280 and the main CPU 100 and the control panel CPUx 103n communicate with each other in the prescribed procedure, and displaying a user registration completed message on the touch panel switch 103a, terminates the new registration of the manual signature.

Thereafter, a user completed the manual signature registration is specified by the collation of a manual signature input through the touch panel switch 103a with the user table 102a and is enabled to use the digital copier 1. That is, any user who is not listed in the user table 102a is rejected to use the digital copier 1.

After a manual signature is registered on the user table 102a, a user who inputs a manual signature is specified by collating the input manual signature with the registered signature and it becomes possible to have the digital copier 1 monitor its use. Accordingly, a user who is not listed on the user table is disabled to use the digital copier 1 and thus, the distribution of a large amount of copies and the illegal copying can be prevented and secrecy of image information can be enhanced.

Figure 17:
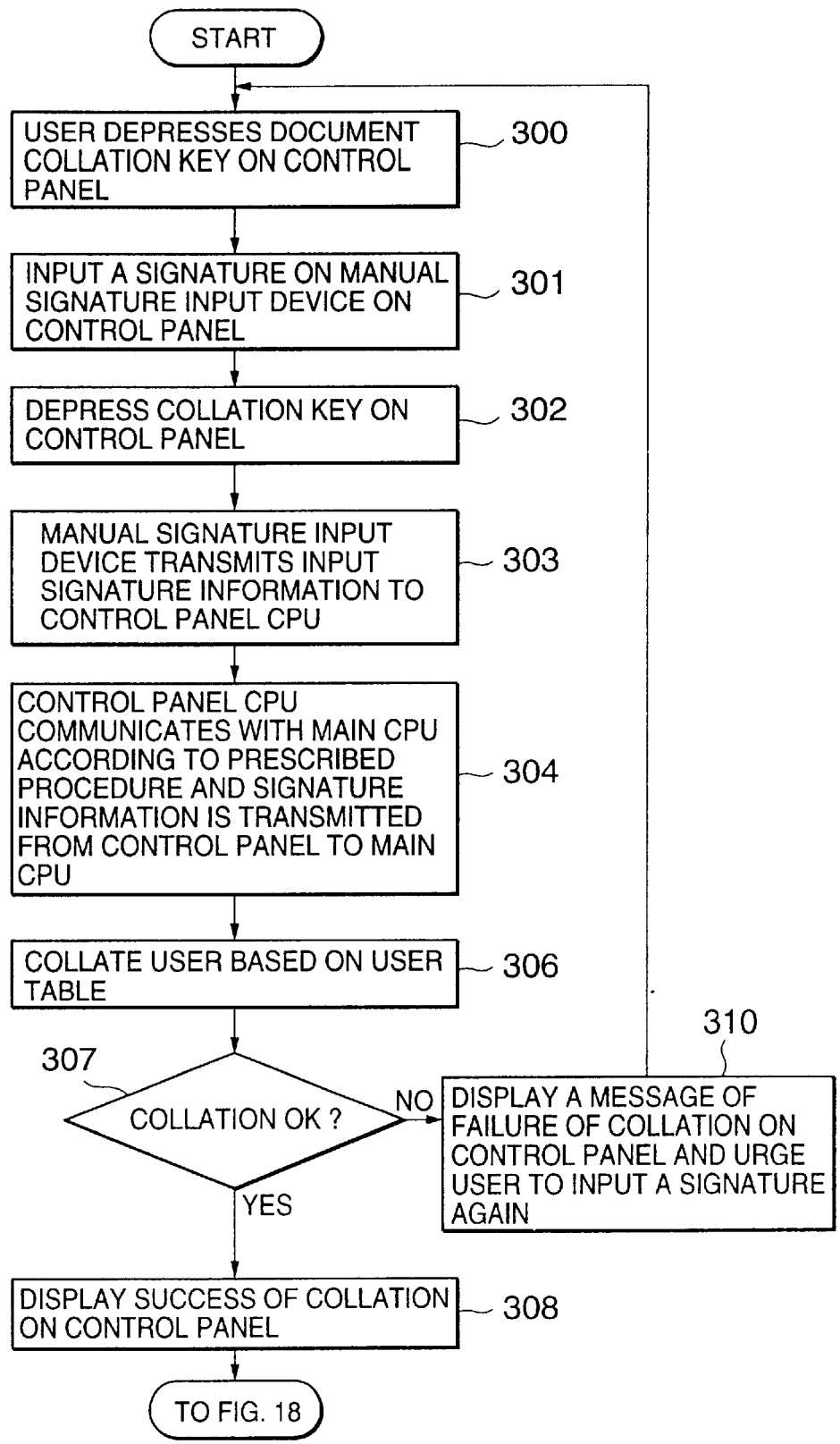
FIG. 17 is a part of a flowchart when collating a signature of a signed document with a manual signature input by user.
Figure 19:
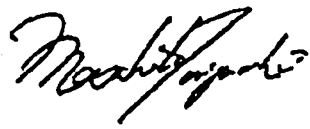
FIG. 19 is a plan view showing a document with a signed signature.

Next, a case wherein a signed document can be copied only by a user who signed the document will be explained using a flowchart shown in FIG. 17. For instance, when a document G3 having a manual signature 150 in a prescribed signature area [A] is copied as shown in FIG. 19, a user depresses the document collation key 103r in Step 300. At this point of time, the manual signature input device 103i on the control panel 103 is placed in the input waiting state. Therefore, the user first proceeds to Step 301 for the collation of a user and inputs a manual signature through the touch panel switch 103a. Then, proceeds to Step 302 and depresses the collation key 103f. The control panel CPUx 103n gets electronic data relative to the manual signature of that user from the manual signature input device 103i. Then, in Step 304 the control panel CPUx 103n communicates with the main CPU 100 according to the prescribed procedure and transmits the electronic data relative to this manual signature to the main CPU 100 through the external interface circuit 103j.

Then, in Step 306 the main CPU 100 collates the received electronic data relative to the manual signature with the registered user's manual signature information stored in the user table 102a and in Step 307, checks whether they agree with each other as a result of the collation. When agreed, the main CPU 100 proceeds to Step 308 and communicates with and so informs the control panel CPUx 103n according to the prescribed procedure. The control panel CPUx 103n displays a messages that the collation is completed and the copy is ready to start on the touch panel switch 103a. When both did not agree, the main CPU 100 proceeds to Step 310, communicates with and so informs the control panel CPUx 103n according to the prescribed procedure. The control panel CPUx 103n displays a message that both signatures did not agree as a result of the collation and displays a message again to urge input of a manual signature.

Figure 18:
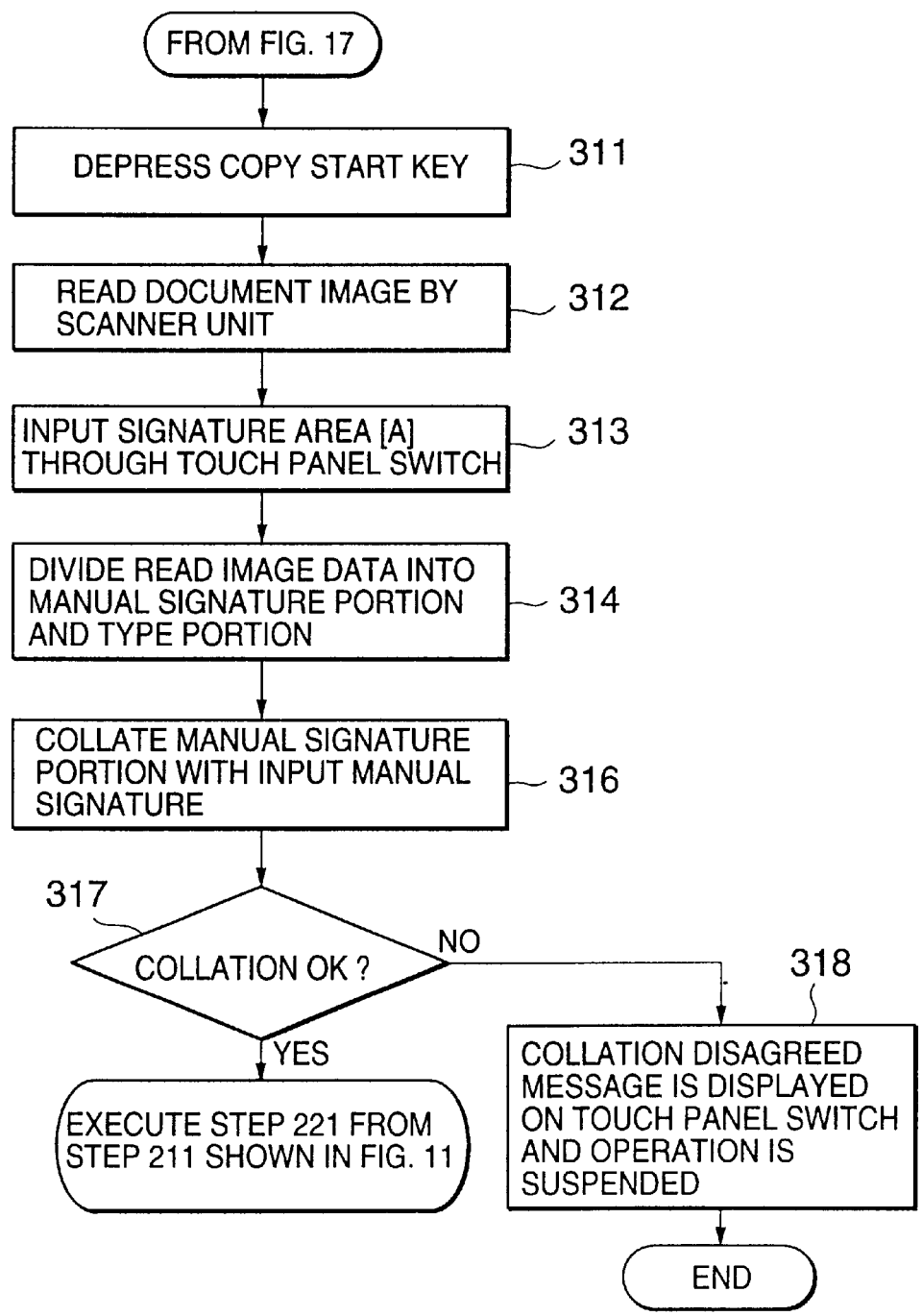
FIG. 18 is a continuous sheet of the flowchart shown in FIG. 17 when collating a signature on a signed document with a manual signature input by user.

When both signatures agreed as a result of the collation of user, proceed to Step 311 shown in FIG. 18, place the document G1 on the document table 5 for collating the input manual signature with the manual signature 150 on the document G1 and depress the start key 103b. As a result, an image is read from the document G1 by the scanner unit 2 in Step 313. Then, in Step 313, input the signature area [A] through the touch panel switch 103a and in Step 314, the image data read from the document G1 is divided into a manual signature portion and a type portion by the data processing mechanism 107g, and in Step 316 the divided manual signature portion is collated with the manual signature that is input by user.

Figure 11:
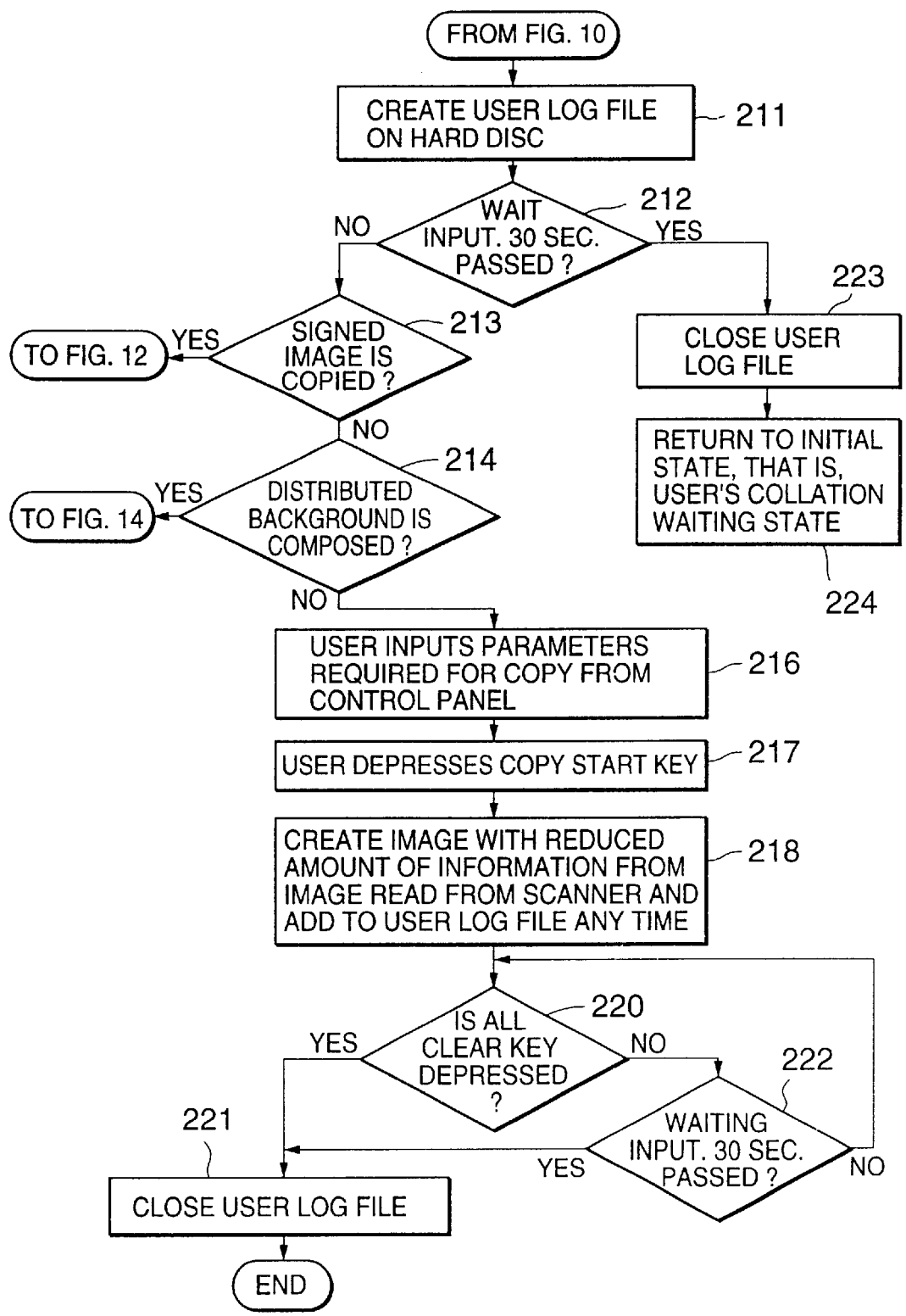
FIG. 11 is a continuous sheet of the flowchart shown in FIG. 10 when performing the image formation.

When both signatures agreed with each other as a result of the collation in Step 317, the copy becomes possible and the copy operation is performed by executing Step 211 through Step 221 of the flowchart shown in FIG. 11. When both signatures did not agree, proceed to Step 318, display a message of the disagreement on the touch panel switch 103a and stop the copy operation.

As the digital copier 1 cannot be used unless the manual signature placed on a document image agreed with the user input manual signature, the possibility for illegal use of the digital copier 1 can be further reduced and secrecy of image information is improved.

When the digital copier 1 is constructed as described above, a user's manual signature is registered on the user table 102a and by collating a subsequently input user's manual signature with the registered signature, a user who input a manual signature is specified and the digital copier 1 monitors its use by the user. When using the digital copier 1, a user is enabled to use it only when his manual signature is input through the touch panel switch 103a and collated and agreed with the registered signature. Therefore, the unnecessary or illegal image formation by a third party can be prevented and secrecy of image information is improved. Furthermore, as the substance copied by user is stored and managed in the user log file 102c, this invention has an effect of suppressing unnecessary or illegal image formation by a third party, etc. and further improves secrecy and reliability of image information.

Further, as the image information is formed by composing the manual signature information input through the touch panel switch 103a or the distributed background stored in the digital copier 1 with document information, it becomes possible to make clear a person or party who copied images or search the route of distribution, and unrestricted copy and illegal copy can be further prevented. Further, if the image information with a distributed background composed with a document image was altered at the time of illegal copying, the trase becomes clearly visible and it is easily judged that it was altered.

Further, as a manual signature is placed on a document image and collated with a manual signature that is subsequently input, the possibility for unnecessary or illegal use of the digital copier 1 by a third party can be reduced and secrecy of image information is further improved.

Figures 20A, 20B:
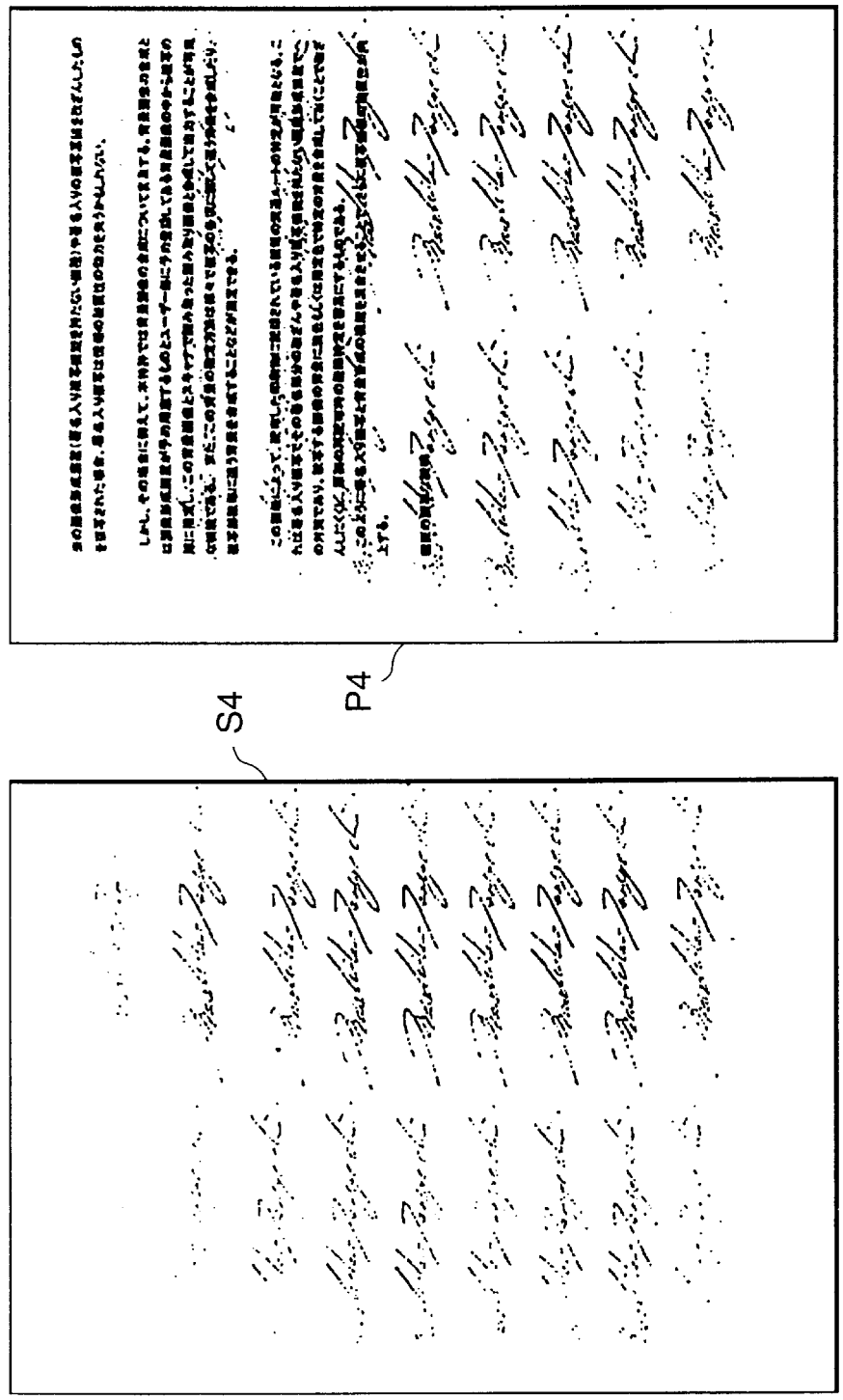
FIG. 20A and FIG. 20B show first modified examples of the present invention.

Further, the present invention is not restricted to the above embodiments and can be modified without departing from the spirit and scope thereof. For instance, a distributed background when forming an image by composing a document image with a distributed background is optionally selectable and all users are able to select it from the touch panel switch 103a or as a first modified example, using a manual signature input through the touch panel switch 103a, a repeated pattern of a manual signature may be formed as the distributed background image S4 as shown in FIG. 20A and by composing this background image with a document image, a composite image information P4 shown in FIG. 20B may be formed. Thus, secrecy of image information is more improved than the ordinary distributed background.

Further, when composing a distributed background with a document image, it is also possible to set a distributed background from which the number of copies or pages can be known automatically in an image forming apparatus in the automatic mode so that the background is composed automatically for every copy or page when forming an image.

Figure 21C:
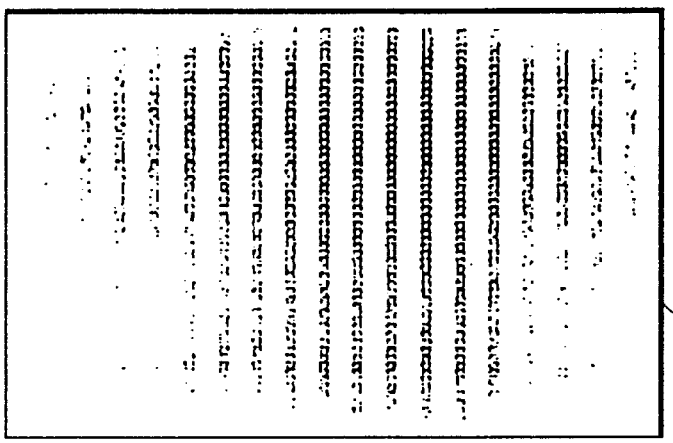
FIG. 21A, FIG. 21B and FIG. 21C show second modified examples of the present invention.
Figure 21B:
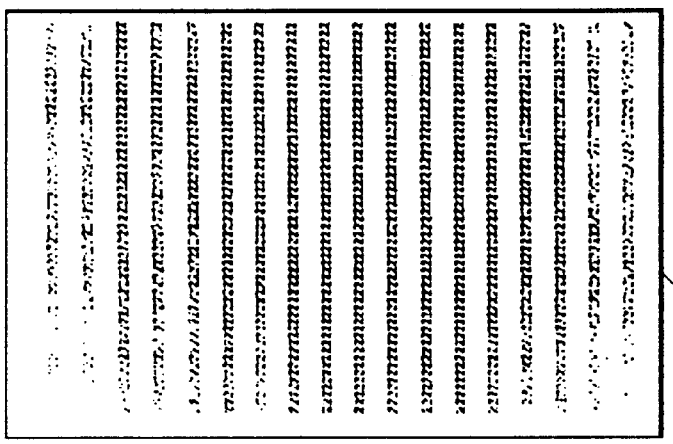
Figure 21A:
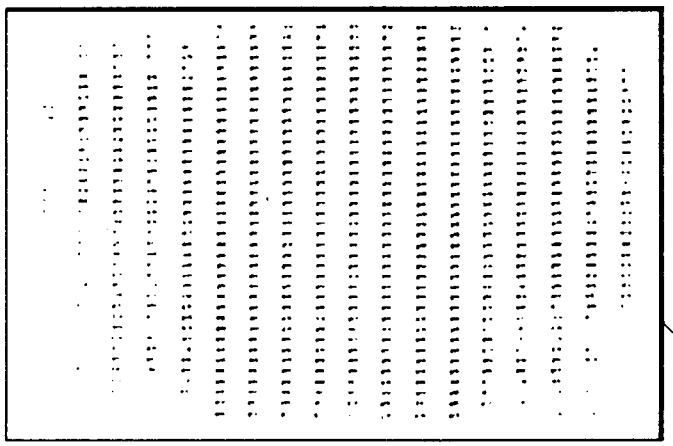
Figure 22C:
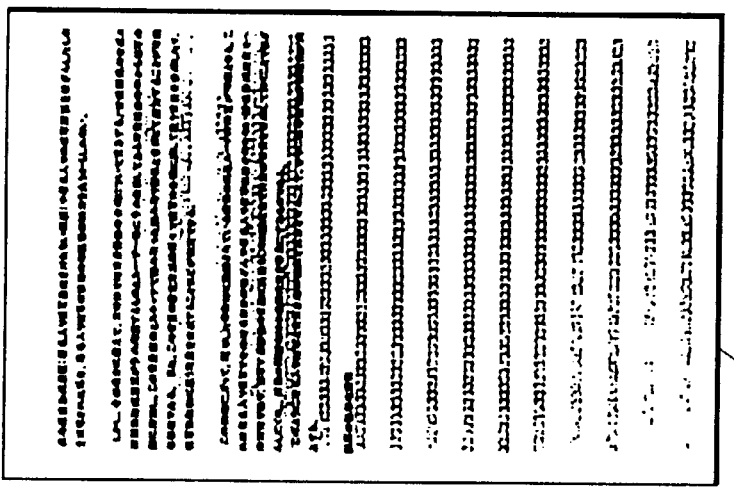
FIG. 22A, FIG. 22B and FIG. 22C show third modified examples of the present invention.
Figure 22B:
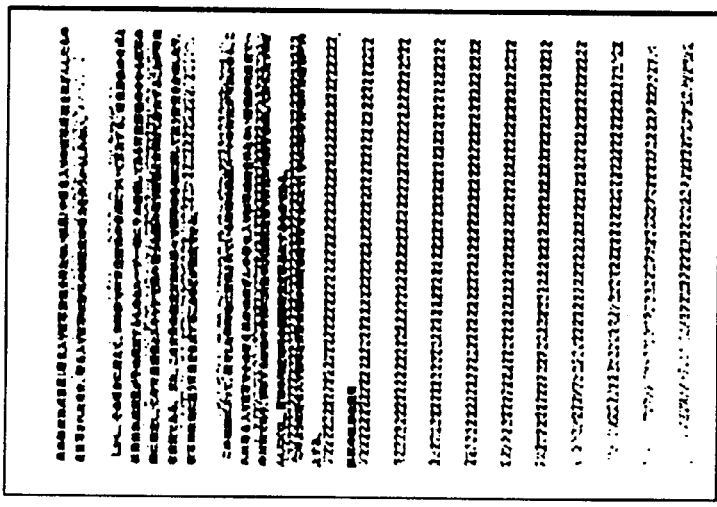
Figure 22A:
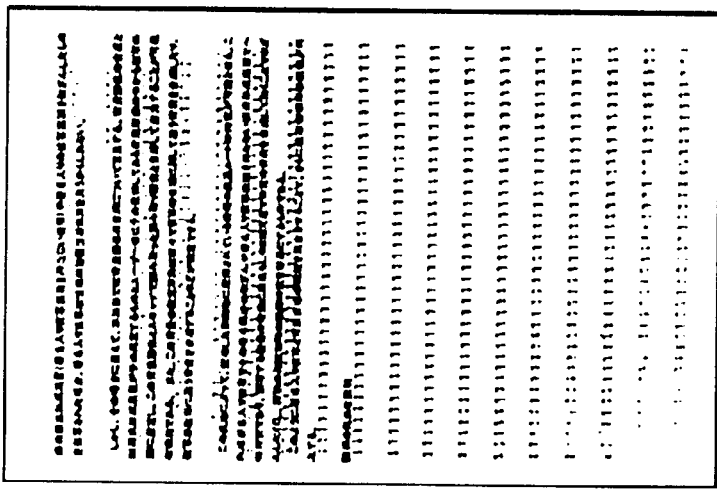

As a second modified example, by preparing 3 kinds of distributed background images S5–S7 shown in FIGS. 21A, 21B and 21C and using these background images for every copy, 3 copies of composite copied images P5–P7 with different distributed backgrounds may be formed by composing with a document image as shown in FIGS. 22A, 22B and 22C.

Further, a distributed background may be shaded or its color may be changed so as to make it difficult to alter the background.

According to the present invention as explained above, as the image forming apparatus becomes usable only when a registered signature stored in the image forming apparatus is collated with a manual signature input by user and they agree with each other, it is possible to prevent unnecessary or illegal image formation and improve secrecy of image information. Furthermore, as the contents of formed images are filed and managed in an image forming apparatus, secrecy and reliability of image information are improved.

Further, it is possible to know who made the image formation by composing a document image with a manual signature and also, suppress unlimited copying as well as illegal copying. In addition, by composing a document image with a distributed background, it becomes possible to specify the circulation route of distributed image information, suppressing unnecessary or illegal image formation and improving secrecy of image information. Further, by collating a manual signature that is input by user with a manual signature on a document image using a manually signed document, the image formation can be made possible and thus, the possibility for unnecessary or illegal use of an image forming apparatus is reduced and secrecy of image information is further improved.

What is claimed is:

1. An image forming system comprising:

a scanner configured to read image data;

an image forming apparatus configured to form an image based on the image data on an image receiving medium;

an input panel configured to input a user's manual signature;

a memory configured to store an image of a user's manual signature; and a processing unit configured to collate an image of a user's manual signature input through the input panel with an image of a user's manual signature stored in the memory and to approve use of at least one of the scanner and image forming apparatus by the user in accordance with a result of the collation, the processing unit being further configured to form the image data by composing the manual signature input through the input panel with a document image.

2. An image forming system according to claim 1, wherein the image of a user's manual signature to be stored in the memory is input through the input panel.

3. An image forming system according to claim 1, further comprising:

a file memory configured to store image data with the amount of the image data reduced, the file memory stores the reduced image data when the processing unit approves the use of at least one of the scanner and the image forming apparatus.

4. An image forming system comprising:

an image forming apparatus configured to form an image based on the image data on an image receiving medium;

an input panel configured to input a user's manual signature;

a memory configured to store an image of a user's manual signature; and a processing unit configured to compose and output a repeated pattern of the user's manual signature input through the input panel as a background image on the image data.

5. An image forming system according to claim 4, wherein the processing unit changes the background image for every copy of the image data.

6. An image forming system according to claim 4, wherein the processing unit changes the background image for every page of the image data.

7. An image forming system according to claim 4, wherein the processing unit collates an image of a user's manual signature input through the input panel with an image of a user's manual signature stored in the memory and to approve use of the image forming apparatus by the user in accordance with a result of the collation.

8. An image forming system according to claim 7, further comprising:

a file memory configured to store image data with the amount of the image data reduced, the file memory stores the reduced image data when the processing unit approves the use of the image forming apparatus.

* * * * *